US010255311B2

(12) United States Patent
LeTourneau

(10) Patent No.: US 10,255,311 B2
(45) Date of Patent: Apr. 9, 2019

(54) MANIPULATING SETS OF HIERARCHICAL DATA

(71) Applicant: Robert T. And Virginia T. Jenkins as Trustees of the Jenkins Family Trust Dated Feb. 8, 2002, Sacramento, CA (US)

(72) Inventor: Jack J. LeTourneau, Santa Barbara, CA (US)

(73) Assignees: Robert T. Jenkins, Sacramento, CA (US), as Trustees of the Jenkins Family Trust Dated Feb. 8, 2002; Virginia T. Jenkins, Sacramento, CA (US), as Trustees of the Jenkins Family Trust Dated Feb. 8, 2002

( * ) Notice: Subject to any disclaimer, the term of this patent is extended or adjusted under 35 U.S.C. 154(b) by 251 days.

(21) Appl. No.: 14/870,744

(22) Filed: Sep. 30, 2015

(65) Prior Publication Data
US 2016/0162528 A1 Jun. 9, 2016

Related U.S. Application Data

(60) Continuation of application No. 13/229,624, filed on Sep. 9, 2011, now Pat. No. 9,177,003, which is a division of application No. 11/005,859, filed on Dec. 6, 2004, now Pat. No. 8,037,102.

(60) Provisional application No. 60/543,371, filed on Feb. 9, 2004.

(51) Int. Cl.
*G06F 17/30* (2006.01)

(52) U.S. Cl.
CPC .. *G06F 17/30327* (2013.01); *G06F 17/30569* (2013.01); *G06F 17/30589* (2013.01)

(58) Field of Classification Search
USPC .......................................................... 707/797
See application file for complete search history.

(56) References Cited

U.S. PATENT DOCUMENTS

| 3,201,701 A | 8/1965 | Maitra |
|---|---|---|
| 3,704,345 A | 11/1972 | Coker |
| 4,001,951 A | 1/1977 | Fasse |
| 4,134,218 A | 1/1979 | Adams et al. |
| 4,156,910 A | 5/1979 | Barton et al. |
| 4,286,330 A | 8/1981 | Isaacson |
| 4,439,162 A | 3/1984 | Blaine |
| 4,677,550 A | 6/1987 | Ferguson |
| 4,737,109 A | 4/1988 | Abramson |
| 4,745,561 A | 5/1988 | Hirosawa et al. |
| 4,751,684 A | 6/1988 | Holt |
| 4,831,525 A | 5/1989 | Saito et al. |
| 4,867,686 A | 9/1989 | Goldstein |
| 4,931,928 A | 6/1990 | Greenfeld |
| 4,949,388 A | 8/1990 | Bhaskaran |

(Continued)

OTHER PUBLICATIONS

Boppana et. al. Full Fault Dictionary Storage Based on Labeled Tree Encoding, Proceedings of 14th VLSI Test Symposium, 1996, pp. 174-179. (Year: 1996).*

(Continued)

*Primary Examiner* — Cheyne D Ly
(74) *Attorney, Agent, or Firm* — Berkeley Law & Technology Group, LLP

(57) ABSTRACT

Embodiments of methods, apparatuses, devices and/or systems for manipulating hierarchical sets of data are disclosed.

42 Claims, 25 Drawing Sheets

(56) References Cited

U.S. PATENT DOCUMENTS

| | | | |
|---|---|---|---|
| 4,989,132 A | 1/1991 | Mellender et al. |
| 4,991,087 A | 2/1991 | Burkowski et al. |
| 5,021,943 A | 6/1991 | Grimes |
| 5,021,992 A | 6/1991 | Kondo |
| 5,050,071 A | 9/1991 | Harris et al. |
| 5,191,522 A | 3/1993 | Bosco et al. |
| 5,235,701 A | 8/1993 | Ohler et al. |
| 5,265,245 A | 11/1993 | Nordstrom et al. |
| 5,295,261 A | 3/1994 | Simonetti |
| 5,335,320 A | 8/1994 | Iwata |
| 5,335,345 A | 8/1994 | Frieder et al. |
| 5,355,496 A | 10/1994 | Fant et al. |
| 5,463,777 A | 10/1995 | Bialkowski et al. |
| 5,493,504 A | 2/1996 | Minato |
| 5,493,678 A | 2/1996 | Arcuri |
| 5,497,500 A | 3/1996 | Rogers et al. |
| 5,509,088 A | 4/1996 | Robson |
| 5,519,627 A | 5/1996 | Mahmood et al. |
| 5,522,068 A | 5/1996 | Berkowitz |
| 5,577,253 A | 11/1996 | Blickstein |
| 5,598,350 A | 1/1997 | Kawanishi et al. |
| 5,606,669 A | 2/1997 | Bertin et al. |
| 5,636,155 A | 6/1997 | Kabuo |
| 5,687,362 A | 11/1997 | Bhargava et al. |
| 5,706,406 A | 1/1998 | Pollock |
| 5,724,512 A | 3/1998 | Winterbottom |
| 5,724,576 A | 3/1998 | Letourneau |
| 5,748,975 A | 5/1998 | Van De Vanter |
| 5,758,152 A | 5/1998 | LeTourneau |
| 5,778,354 A | 7/1998 | Leslie |
| 5,778,371 A | 7/1998 | Fujihara |
| 5,781,906 A | 7/1998 | Aggarwal et al. |
| 5,787,415 A | 7/1998 | Jacobson et al. |
| 5,787,432 A | 7/1998 | Letourneau |
| 5,796,356 A | 8/1998 | Okada et al. |
| 5,802,370 A | 9/1998 | Sitbon et al. |
| 5,822,593 A | 10/1998 | Lamping et al. |
| 5,826,262 A | 10/1998 | Bui |
| 5,848,159 A | 12/1998 | Collins et al. |
| 5,905,138 A | 5/1999 | Van Broekhoven |
| 5,930,805 A | 7/1999 | Marquis |
| 5,937,181 A | 8/1999 | Godefroid |
| 5,970,490 A | 10/1999 | Morgenstern |
| 5,978,790 A * | 11/1999 | Buneman .......... G06F 17/30294 |
| 5,987,449 A | 11/1999 | Suciu |
| 5,999,926 A | 12/1999 | Suciu |
| 6,002,879 A | 12/1999 | Radigan et al. |
| 6,003,033 A | 12/1999 | Amano et al. |
| 6,022,879 A | 2/2000 | Crow et al. |
| 6,028,987 A | 2/2000 | Hirairi |
| 6,055,537 A | 4/2000 | LeTourneau |
| 6,076,087 A | 6/2000 | Suciu |
| 6,088,691 A | 7/2000 | Bhargava et al. |
| 6,141,655 A | 10/2000 | Johnson et al. |
| 6,199,103 B1 | 3/2001 | Sakuguchi et al. |
| 6,236,410 B1 | 5/2001 | Politis et al. |
| 6,243,859 B1 | 6/2001 | Chen-Kuang |
| 6,289,354 B1 | 9/2001 | Aggarwal et al. |
| 6,292,938 B1 | 9/2001 | Sarkar et al. |
| 6,314,559 B1 | 11/2001 | Sollich |
| 6,336,812 B1 | 1/2002 | Cooper et al. |
| 6,341,372 B1 | 1/2002 | Datig |
| 6,442,584 B1 | 8/2002 | Kolli et al. |
| 6,446,256 B1 | 9/2002 | Hyman et al. |
| 6,466,240 B1 | 10/2002 | Maslov |
| 6,505,205 B1 | 1/2003 | Kothuri et al. |
| 6,542,899 B1 | 4/2003 | Saulpaugh et al. |
| 6,550,024 B1 | 4/2003 | Pagurek et al. |
| 6,556,983 B1 | 4/2003 | Altschuler et al. |
| 6,598,052 B1 | 7/2003 | Saulpaugh et al. |
| 6,606,632 B1 | 8/2003 | Saulpaugh et al. |
| 6,606,741 B2 | 8/2003 | Kojima et al. |
| 6,609,130 B1 | 8/2003 | Saulpaugh et al. |
| 6,610,106 B1 | 8/2003 | Jenks |
| 6,611,844 B1 | 8/2003 | Saulpaugh et al. |
| 6,640,218 B1 | 10/2003 | Golding |
| 6,658,649 B1 | 12/2003 | Bates et al. |
| 6,691,301 B2 | 2/2004 | Bowen |
| 6,714,939 B2 | 3/2004 | Saldanha et al. |
| 6,728,953 B1 | 4/2004 | Walster |
| 6,745,384 B1 | 6/2004 | Biggerstaff |
| 6,748,378 B1 | 6/2004 | Lavender et al. |
| 6,763,515 B1 | 7/2004 | Vazquez et al. |
| 6,785,673 B1 | 8/2004 | Fernandez et al. |
| 6,817,865 B2 | 11/2004 | Charbonneau |
| 6,829,695 B1 | 12/2004 | Ross |
| 6,847,979 B2 | 1/2005 | Allemang et al. |
| 6,854,976 B1 | 2/2005 | Suhr |
| 6,874,005 B2 | 3/2005 | Fortenberry et al. |
| 6,965,990 B2 | 11/2005 | Barsness et al. |
| 6,968,330 B2 | 11/2005 | Edwards et al. |
| 6,978,271 B1 | 12/2005 | Hoffman |
| 7,043,555 B1 | 5/2006 | McClain et al. |
| 7,051,033 B2 | 5/2006 | Agarwal et al. |
| 7,072,904 B2 | 7/2006 | Najork et al. |
| 7,103,838 B1 | 9/2006 | Krishnamurthy et al. |
| 7,107,265 B1 | 9/2006 | Calvignac et al. |
| 7,117,196 B2 | 10/2006 | Gaur et al. |
| 7,117,479 B2 | 10/2006 | Van De Vanter |
| 7,127,704 B2 | 10/2006 | Van De Vanter et al. |
| 7,134,075 B2 | 11/2006 | Hind et al. |
| 7,140,006 B2 | 11/2006 | Harrison et al. |
| 7,162,485 B2 | 1/2007 | Gottlob et al. |
| 7,191,182 B2 | 3/2007 | Anonsen et al. |
| 7,203,680 B2 | 4/2007 | Parida |
| 7,203,774 B1 | 4/2007 | Zhou et al. |
| 7,287,026 B2 | 10/2007 | Oommen |
| 7,313,563 B2 | 12/2007 | Bordawekar et al. |
| 7,318,215 B1 | 1/2008 | Krishnan et al. |
| 7,337,163 B1 | 2/2008 | Srinivasan |
| 7,356,802 B2 | 4/2008 | de Sutter et al. |
| 7,360,202 B1 | 4/2008 | Seshadri et al. |
| 7,409,673 B2 | 8/2008 | Kuo et al. |
| 7,419,376 B2 | 9/2008 | Sarvazyan et al. |
| 7,437,666 B2 | 10/2008 | Ramarao |
| 7,475,070 B2 | 1/2009 | Fan et al. |
| 7,496,892 B2 | 2/2009 | Nuss |
| 7,512,932 B2 | 3/2009 | Davidov et al. |
| 7,536,675 B2 | 5/2009 | Gallagher |
| 7,536,676 B2 | 5/2009 | Baker |
| 7,544,062 B1 | 6/2009 | Hauschild et al. |
| 7,561,927 B2 | 7/2009 | Oyama et al. |
| 7,571,156 B1 | 8/2009 | Gupta et al. |
| 7,571,169 B2 | 8/2009 | Jones et al. |
| 7,574,692 B2 | 8/2009 | Herscu |
| 7,575,434 B2 | 8/2009 | Palakodeti |
| 7,620,632 B2 | 11/2009 | Andrews |
| 7,627,591 B2 | 12/2009 | LeTourneau |
| 7,630,995 B2 | 12/2009 | LeTourneau |
| 7,636,727 B2 | 12/2009 | Schiffmann et al. |
| 7,650,592 B2 | 1/2010 | Eckels et al. |
| 7,669,183 B2 | 2/2010 | Bowman et al. |
| 7,681,177 B2 | 3/2010 | LeTourneau |
| 7,761,847 B2 | 7/2010 | Kornerup et al. |
| 7,761,858 B2 | 7/2010 | Chang et al. |
| 7,765,183 B2 | 7/2010 | Williams, Jr. |
| 7,779,396 B2 | 8/2010 | Meijer et al. |
| 7,801,923 B2 | 9/2010 | LeTourneau |
| 7,861,304 B1 | 12/2010 | Nachenberg |
| 7,882,147 B2 | 2/2011 | LeTourneau |
| 7,890,928 B2 | 2/2011 | Patrudu |
| 7,899,821 B1 | 3/2011 | Schiffmann |
| 8,032,860 B2 | 10/2011 | Piehler et al. |
| 8,037,102 B2 | 10/2011 | LeTourneau |
| 8,060,868 B2 | 11/2011 | Meijer et al. |
| 8,112,740 B2 | 2/2012 | Meijer et al. |
| 8,151,276 B2 | 4/2012 | Grechanik |
| 8,181,155 B2 | 5/2012 | Pinto et al. |
| 8,230,526 B2 | 7/2012 | Holland et al. |
| 8,250,526 B2 | 8/2012 | Anderson et al. |
| 8,316,059 B1 | 11/2012 | Schiffmann |
| 8,356,040 B2 | 1/2013 | LeTourneau |
| 8,365,137 B2 | 1/2013 | Fant |
| 8,438,534 B2 | 5/2013 | Thomson |

(56) References Cited

U.S. PATENT DOCUMENTS

| | | | |
|---|---|---|---|
| 8,443,339 B2 | 5/2013 | LeTourneau |
| 8,626,777 B2 | 1/2014 | LeTourneau |
| 8,650,201 B2 | 2/2014 | LeTourneau |
| 8,683,431 B2 | 3/2014 | Thomson et al. |
| 8,762,942 B2 | 6/2014 | Langworthy et al. |
| 9,002,862 B2 | 4/2015 | Schiffmann |
| 9,020,961 B2 | 4/2015 | LeTourneau |
| 9,043,347 B2 | 5/2015 | LeTourneau |
| 9,077,515 B2 | 7/2015 | LeTourneau |
| 9,330,128 B2 | 5/2016 | Schiffmann |
| 9,411,841 B2 | 8/2016 | Schiffmann |
| 9,425,951 B2 | 8/2016 | LeTourneau |
| 9,563,653 B2 | 2/2017 | LeTourneau |
| 9,646,034 B2 | 5/2017 | Schiffmann |
| 9,646,107 B2 | 5/2017 | LeTourneau |
| 9,842,130 B2 | 12/2017 | Schiffmann |
| 2001/0003211 A1 | 6/2001 | Bera |
| 2001/0037496 A1 | 11/2001 | Simonyi |
| 2002/0062259 A1 | 2/2002 | Katz et al. |
| 2002/0040292 A1 | 4/2002 | Marcu |
| 2002/0059281 A1 | 5/2002 | Watanabe et al. |
| 2002/0091676 A1* | 7/2002 | Agrawal ............ G06F 17/30705 |
| 2002/0107860 A1 | 8/2002 | Gobeille et al. |
| 2002/0129129 A1 | 9/2002 | Bloch et al. |
| 2002/0130796 A1 | 9/2002 | Tsuchido et al. |
| 2002/0133497 A1 | 9/2002 | Draper et al. |
| 2002/0149604 A1 | 10/2002 | Wilkinson |
| 2002/0169563 A1 | 11/2002 | de Carvalho Ferreira |
| 2002/0194163 A1* | 12/2002 | Hopeman ............ G06F 17/30864 |
| 2003/0041088 A1 | 2/2003 | Wilson et al. |
| 2003/0065659 A1 | 4/2003 | Agarwal et al. |
| 2003/0115559 A1 | 6/2003 | Sawada |
| 2003/0130977 A1 | 7/2003 | Oommen |
| 2003/0167445 A1 | 9/2003 | Su et al. |
| 2003/0195885 A1 | 10/2003 | Emmick et al. |
| 2003/0195890 A1 | 10/2003 | Oommen |
| 2003/0236794 A1 | 12/2003 | Hostetter et al. |
| 2004/0010752 A1 | 1/2004 | Chan et al. |
| 2004/0019599 A1 | 1/2004 | Trappen |
| 2004/0024790 A1 | 2/2004 | Everett |
| 2004/0044659 A1 | 3/2004 | Judd et al. |
| 2004/0054692 A1 | 3/2004 | Seyrat et al. |
| 2004/0060006 A1 | 3/2004 | Lindblad |
| 2004/0060007 A1 | 3/2004 | Gottlob et al. |
| 2004/0068498 A1 | 4/2004 | Patchet et al. |
| 2004/0075677 A1 | 4/2004 | Loyall |
| 2004/0103105 A1 | 5/2004 | Lindblad et al. |
| 2004/0122844 A1 | 6/2004 | Malloy |
| 2004/0125124 A1 | 7/2004 | Kim |
| 2004/0160464 A1 | 8/2004 | Reyna |
| 2004/0205047 A1 | 10/2004 | Carpenter |
| 2004/0215642 A1 | 10/2004 | Cameron et al. |
| 2004/0239674 A1 | 12/2004 | Ewald et al. |
| 2004/0254909 A1 | 12/2004 | Testa |
| 2004/0260683 A1 | 12/2004 | Chan et al. |
| 2004/0260684 A1 | 12/2004 | Agrawal et al. |
| 2004/0268236 A1 | 12/2004 | Childlovskii et al. |
| 2005/0021548 A1 | 1/2005 | Bohannon et al. |
| 2005/0023524 A1 | 2/2005 | Beatty |
| 2005/0027495 A1 | 2/2005 | Matichuk |
| 2005/0027743 A1 | 2/2005 | O'Neil et al. |
| 2005/0028091 A1 | 2/2005 | Bordawekar |
| 2005/0050016 A1 | 3/2005 | Stanoi et al. |
| 2005/0050066 A1 | 3/2005 | Hughes |
| 2005/0058976 A1 | 3/2005 | Vernon |
| 2005/0060332 A1 | 3/2005 | Bernstein et al. |
| 2005/0065964 A1 | 3/2005 | Ziemann et al. |
| 2005/0125432 A1 | 6/2005 | Lin et al. |
| 2005/0138073 A1 | 6/2005 | Zhou et al. |
| 2005/0154265 A1 | 7/2005 | Miro et al. |
| 2005/0154979 A1 | 7/2005 | Chidlovskii et al. |
| 2005/0156761 A1 | 7/2005 | Oh |
| 2005/0165732 A1 | 7/2005 | Burges |
| 2005/0187900 A1 | 8/2005 | LeTourneau |
| 2005/0214727 A1 | 9/2005 | Stoianovici et al. |
| 2005/0216445 A1 | 9/2005 | Rao |
| 2005/0267908 A1 | 12/2005 | LeTourneau |
| 2005/0286788 A1 | 12/2005 | Orr |
| 2006/0004817 A1 | 1/2006 | Andrews |
| 2006/0005122 A1 | 1/2006 | Lemoine |
| 2006/0015538 A1 | 1/2006 | LeTourneau |
| 2006/0053122 A1 | 3/2006 | Korn et al. |
| 2006/0074838 A1 | 4/2006 | Srivastava |
| 2006/0095442 A1 | 5/2006 | LeTourneau |
| 2006/0095455 A1 | 5/2006 | LeTourneau |
| 2006/0123029 A1 | 6/2006 | LeTourneau |
| 2006/0129582 A1 | 6/2006 | Schiffmann et al. |
| 2006/0209351 A1 | 9/2006 | Saito et al. |
| 2006/0259533 A1 | 11/2006 | LeTourneau |
| 2006/0271573 A1 | 11/2006 | LeTourneau |
| 2007/0003917 A1 | 1/2007 | Kitching et al. |
| 2007/0198538 A1 | 8/2007 | Palacios |
| 2008/0270435 A1 | 10/2008 | Furusho |
| 2008/0313196 A1 | 10/2008 | Furusho |
| 2010/0094885 A1 | 4/2010 | LeTourneau |
| 2010/0094908 A1 | 4/2010 | LeTourneau |
| 2010/0114969 A1 | 4/2010 | LeTourneau |
| 2010/0191775 A1 | 7/2010 | Schiffmann et al. |
| 2010/0205581 A1 | 8/2010 | LeTourneau |
| 2012/0144388 A1 | 6/2012 | Schiffmann |

OTHER PUBLICATIONS

U.S. Appl. No. 11/007,139 / RCE, Nov. 10, 2016, 3 pages.
U.S. Appl. No. 11/007,139 / Notice of Allowance and Fees, dated Dec. 29, 2016, 8 pages.
U.S. Appl. No. 11/007,139 / Issue Notification, dated Apr. 19, 2017, 1 page.
U.S. Appl. No. 15/043,267 / Notice of Publication, dated Feb. 2, 2017, 1 page.
U.S. Appl. No. 12/573,829 / Non-Final Rejection, dated Dec. 16, 2016, 10 pages.
U.S. Appl. No. 12/573,829 / Amendment/Req. Reconsideration-After Non-Final Reject, dated Mar. 16, 2017, 18 pages.
U.S. Appl. No. 12/573,829 / Final Rejection, dated May 2, 2017, 20 pages.
U.S. Appl. No. 12/573,829 / After Final Consideration Program Request, dated Jul. 5, 2017, 13 pages.
U.S. Appl. No. 15/250,118 / Applicant Response to Pre-Exam Formalities Notice, dated Nov. 8, 2016, 21 pages.
U.S. Appl. No. 15/250,118 / Filing Receipt, dated Nov. 15, 2016, 3 pages.
U.S. Appl. No. 15/250,118 / Notice of Publication, dated Feb. 23, 2017, 1 page.
U.S. Appl. No. 15/250,118 / Non-Final Rejection, dated Jun. 15, 2017, 22 pages.
U.S. Appl. No. 15/214,168 / Notice of Publication, dated Nov. 10, 2016, 1 page.
U.S. Appl. No. 15/214,168 / Non-Final Rejection, dated Mar. 2, 2017, 20 pages.
U.S. Appl. No. 15/214,168 / Amendment/Req. Reconsideration-After Non-Final Reject, dated Jun. 2, 2017, 39 pages.
U.S. Appl. No. 12/830,236 / Final Rejection, dated Dec. 14, 2016, 22 pages.
U.S. Appl. No. 12/830,236 / Response After Final Action, dated Feb. 13, 2017, 14 pages.
U.S. Appl. No. 12/830,236 / Advisory Action, dated Mar. 3, 2017, 2 pages.
U.S. Appl. No. 12/830,236 / RCE and Amendments, dated Apr. 14, 2017, 17 pages.
U.S. Appl. No. 12/830,236 / Non-Final Rejection, dated Jun. 21, 2017, 30 pages.
U.S. Appl. No. 15/081,612 / RCE, Jan. 30, 2017, 2 pages.
U.S. Appl. No. 15/081,612 / Issue Fee Payment, dated Jan. 30, 2017, 1 page.
U.S. Appl. No. 15/081,612 / Notice of Allowance and Fees Due, dated Jan. 30, 2017, 2 pages.
U.S. Appl. No. 15/081,612 / Notice of Allowance and Fees Due, dated Feb. 13, 2017, 7 pages.

(56) References Cited

OTHER PUBLICATIONS

U.S. Appl. No. 15/081,612 / Amendment After Notice of Allowance, dated Mar. 20, 2017, 4 pages.
U.S. Appl. No. 15/081,612 / Issue Fee Payment, dated Mar. 20, 2017, 1 page.
U.S. Appl. No. 15/240,964 / Notice of Publication, dated Dec. 8, 2016.
U.S. Appl. No. 15/240,964 / Non-Final Rejection, dated Mar. 14, 2017, 23 pages.
U.S. Appl. No. 5/240,964 / Amendment/Req. Reconsideration-After Non-Final Reject, dated Jun. 14, 2017, 27 pages.
U.S. Appl. No. 14/614,292 / Issue Fee Payment and Amendment after Notice of Allowance, dated Dec. 21, 2016, 4 pages.
U.S. Appl. No. 14/614,292 / Issue Notification, dated Jan. 18, 2017, 1 page.
U.S. Appl. No. 15/411,823 / Application as filed, Jan. 20, 2017, 77 pages.
U.S. Appl. No. 15/411,823 / Preliminary Amendment, dated Jan. 20, 2017, 25 pages.
U.S. Appl. No. 15/411,823 / Filing Receipt, dated Jan. 31, 2017, 3 pages.
U.S. Appl. No. 15/411,823 / Notice of Publication, dated May 11, 2017, 1 page.
U.S. Appl. No. 14/968,429 / Non-Final Rejection, dated May 15, 2017, 8 pages.
"Core Technology Benchmarks A White Paper", Jul. 2002, downloaded from the internet Mar. 2, 2004.
"Origin Data, Inc. White Paper", © 1999, pp. 1-13.
"The Associative Model of Data White Paper", Lazy Software, Ltd., 2000.
ACM Portal Search Results (Kleene and prime and enumeration and operation and natural and numerals and sequences and "enumeration operation") conducted by Examiner on Jul. 18, 2009, 6 pages.
ACM Portal Search Results (Kleene and prime and enumeration and operation and natural and numerals and sequences and enumeration and operation) conducted by Examiner on Jul. 18, 2009, 1 page.
Alderson et al., "Toward an Optimization Driven Framework for Designing and Generating Realistic Internet Topologies" ACM SIGCOMM Computer Communications Review 41, vol. 33, No. 1, pp. 41-46, 2003.
Apostol, "A Centennial History of the Prime Number Theorem", Engineering and Science, No. 4, 1996.
Benedikt et al., "Definable Relations and First-Order Query Languages over Strings" Journal of the ACM, vol. 50, No. 5, pp. 694-751, 2003.
Cano et al., "Lazy Evaluation in Penniless Propagation over Join Trees", Networks, vol. 39(4), 2002 Wiley Periodicals, Inc., 175-185, 2002.
Cole, Richard, Hariharan, Ramesh, and Indyk, Piotr. "Tree pattern matching and subset matching in deterministic 0(n log 3 n)-time", Proceedings of the Tenth Annual ACM-SIAM Symposium on Discrete Algorithms, p. 1-10, Jan. 2, 1999, Baltimore, Maryland, United States.
Cooper et al., "Oh! Pascal!", 1982, W.W. Norton & Company, Inc., Chapter 12, Arrays for Random Access, pp. 295-327.
Coenen, Frans; Leng, Paul and Ahmed, Shakil; "T-Trees, Vertical Partitioning and Distributed Association Rule Mining", IEEE, 2003.
Dubiner, M., Galil, Z., and Magen, E. "Faster Tree Pattern Matching.", Journal of the Association for Computing Machinery, vol. 41, No. 2, Mar. 1994, pp. 205-213.
Durango Bill's Enumeration of Trees. http://web.archive.org/web/20021028184112/http://www.durangobill.com/Trees.html, 1998.
Er, M.C., "Enumerating Ordered Trees Lexicographically", The Computation Journal, vol. 28, Issue 5, pp. 538-542, 1985.
Google search (Kleene prime enumeration operation natural numerals sequences "Kleene prime") conducted by Examiner on Jul. 18, 2009, 2 pages.
Google Search (Kleene prime enumeration operation natural numerals sequences "enumeration operation") conducted by Examiner on Jul. 18, 2009, 2 pages.
Google Search (Kleene prime enumeration operation) conducted by Examiner on Jul. 18, 2009, 2 pages.
Hoffman et al., "Pattern Matching in Trees", Purdue University, Jan. 1982, Journal for the Association for Computing Machinery, vol. 29, Issue 1, pp. 68-95.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result conducted by Examiner on Jul. 18, 2009, 1 page.
Johnston et al. Advances in Dataflow Programming Languages, ACM Computing Surveys, vol. 36, No. 1, pp. 1-34, 2004.
Kharbutli et al., "Using Prime Numbers for Cache Indexing to Eliminate Conflict Misses", Dept. of Electrical and Computer Engineering, North Carolina State University, Feb. 2004, 24 pages.
Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
LeTourneau, "The Elementary Theory of Object Oriented Arithmetic", pp. 1-9, Apr. 1990.
Malhotra et al, "A Methodology for Formal Expression of Hierarchy in Model Solution", IEEE, pp. 258-267, 1983.
Navarro, "A Guided Tour to Approximate String Matching", ACM Computing Surveys, vol. 33, No. 1, pp. 31-88, 2001.
Neven, Frank and Thomas Schwentick, "Expressive and efficient pattern languages for tree-structured data" Proceedings of the Nineteenth ACM SIGACT-SIGMOND-SIGART Symposium on Principles of Database Systems, May 2000.
Ramesh, R. and Ramakrishnan, I.V., "Nonlinear Pattern Matching in Trees." Journal of the Association for Computer Machinery, vol. 39, No. 2. Apr. 1992, pp. 295-316.
Reiss, "Semantics-Based Code Search", IEEE ICSE, pp. 243-253, 2009.
Sechrest et al., "Blending Hierarchical and Attribute-Based File Naming", Distributed Computing System, 1992, Proceedings of the 12$^{th}$ International Conference on Jun. 9-12, 1992, pp. 572-580.
Shanmugasundaram et al., "Querying SML Views of Relational Data", Proceedings of the 27$^{th}$ VLDB Conference, Roma, Italy, 2001, 9 pages.
Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.
Smorynski, Craig, "Logical Number Theory I: An Introduction", Springer-Verlag Berlin Heidelberg, © 1991, Arithmetic Encoding, The Cantor Pairing Function, pp, 14-23, and 305.
Somani et al., "Phased-Mission System Analysis Using Boolean Algebraic Methods", May 1994, ACM Press, vol. 22, Issue 1.
Sproat et al., "Compilation of Weighted Finite-State Tranducers from Decision Trees" Acm, pp. 215-222, 1996.
Stanat, D.F., and McAllister, D.F., "Discrete Mathematics in Computer Science", Prentice-Hall, 1977, Binary Relations, Ch. 3, Sec. 3.2, Trees, p. 131-145.
Talukdar, "Learning to Create Data-Integrating Queries", ACM PVLDB, pp. 785-796, 2008.
Valiente, "Algorithms on Trees and Graphs", Tree Isomorphism, pp. 151-251, Springer 2002.
Valiente, Gabriel, "Tree Isomorphism," of Algorithms on Trees and Graphs, Chapter 4, published by Springer, 2002, 51 pages.

(56) References Cited

OTHER PUBLICATIONS

Wu, "A Prime Number Labeling Scheme for Dynamic Ordered XML Trees", IEEE, 2004, 13 pages.
Zaks, S., "Lexicographic Generation of Ordered Trees", Dept. of Computer Science, University of Illinois, The Journal of Theoretical Computer Science, vol. 10(1), pp. 63-82, Revised 1978.
U.S. Appl. No. 11/005,859 / Application filed Dec. 6, 2004, 120 pages.
U.S. Appl. No. 11/005,859 / Notice to File Missing parts dated Jan. 10, 2005, 2 pages.
U.S. Appl. No. 11/005,859 / Response to Notice to File Missing parts dated Apr. 1, 2005, 9 pages.
U.S. Appl. No. 11/005,859 / Preliminary Amendment dated Apr. 28, 2005, 193 pages.
U.S. Appl. No. 11/005,859 / Office Action—Restriction Requirement dated Dec. 12, 2007, 7 pages.
U.S. Appl. No. 11/005,859 / Response to Office Action—Restriction Requirement dated Jan. 14, 2008, 82 pages.
U.S. Appl. No. 11/005,859 / Non-final Office Action dated Mar. 21, 2008, 10 pages.
U.S. Appl. No. 11/005,859 / Amendment dated Jul. 21, 2008, 86 pages.
U.S. Appl. No. 11/005,859 / Final Office Action dated Oct. 30, 2008, 14 pages.
U.S. Appl. No. 11/005,859 / Amendment filed Dec. 30, 2008, 83 pages.
U.S. Appl. No. 11/005,859 / Advisory Action dated Jan. 13, 2009, 4 pages.
U.S. Appl. No. 11/005,859 / RCE with amendment dated Apr. 30, 2009, 86 pages.
U.S. Appl. No. 11/005,859 / Final Office Action dated Jul. 8, 2009, 9 pages.
U.S. Appl. No. 11/005,859 / Examiner Interview Summary received Oct. 27, 2009, 3 pages.
U.S. Appl. No. 11/005,859 / Amendment dated Dec. 8, 2009, 83 pages.
U.S. Appl. No. 11/005,859 / Advisory Action dated Dec. 22, 2009, 3 pages.
U.S. Appl. No. 11/005,859 / RCE with Amendment dated Jan. 7, 2010, 85 pages.
U.S. Appl. No. 11/005,859 / Non-Final Office Action dated Jan. 21, 2010, 8 pages.
U.S. Appl. No. 11/005,859 / Response to Non-Final Office Action dated Feb. 25, 2010, 83 pages.
U.S. Appl. No. 11/005,859 / Final Office Action dated Jun. 8, 2010, 9 pages
U.S. Appl. No. 11/005,859 / Office Action Response dated Sep. 1, 2010, 89 pages.
U.S. Appl. No. 11/005,859 / Advisory Action dated Sep. 14, 2010, 3 pages.
U.S. Appl. No. 11,005,859 / Notice of Appeal dated Sep. 29, 2010, 1 page.
U.S. Appl. No. 11/005,859 / Office Action dated Oct. 15, 2010, 5 pages.
U.S. Appl. No. 11,005,859 / Office Action Response dated Jan. 18, 2011, 95 pages.
U.S. Appl. No. 11/005,859 / Final Office Action dated Mar. 30, 2011, 7 pages.
U.S. Appl. No. 11/005,859 / Notice of Allowance and Fees Due, dated Jun. 9, 2011, 11 pages.
U.S. Appl. No. 11/005,859 / Amendment after Notice of Allowance and Issue Fee Payment, dated Sep. 9, 2011, 2 pages.
U.S. Appl. No. 11/005,859 / Issue Notification, dated Sep. 21, 2011, 1 page.
U.S. Appl. No. 13/229,624 / Application as filed on Sep. 9, 2011, 139 pages.
U.S. Appl. No. 13/229,624 / Filing receipt, dated Sep. 21, 2011, 4 pages.
U.S. Appl. No. 13/229,624 / Non-Final Office Action, dated Nov. 23, 2011, 8 pages.
U.S. Appl. No. 13/229,624 / Notice of Publication, dated Dec. 30, 2011, 1 page.
U.S. Appl. No. 13/229,624 / Amendment, dated Feb. 23, 2012, 22 pages.
U.S. Appl. No. 13/229,624 / Final Office Action, dated Mar. 20, 2012, 10 pages.
U.S. Appl. No. 13/229,624 / Amendment after final, dated Jun. 13, 2012, 25 pages.
U.S. Appl. No. 13/229,624 / Advisory Action, dated Jun. 20, 2012, 4 pages.
U.S. Appl. No. 13/229,624 / RCE, dated Jul. 20, 2012, 26 pages.
U.S. Appl. No. 13/229,624 / Non-Final Rejection, dated Oct. 2, 2013, 9 pages.
U.S. Appl. No. 13/229,624 / Response to non-final office action, dated Dec. 27, 2013, 11 pages.
U.S. Appl. No. 13/229,624 / Non-Final Office Action, dated Apr. 4, 2014, 5 Pages.
U.S. Appl. No. 13/229,624 / Non-Final Office Action Response, dated Aug. 1. 2014, 9 Pages.
U.S. Appl. No. 13/229,624 / Final Rejection. dated Oct. 30, 2014, 6 pages.
U.S. Appl. No. 13/229,624 / Response and Amendments after Final, dated Jan. 30, 2015, 11 pages.
U.S. Appl. No. 13/229,624 / Advisory Action, dated Mar. 11, 2015, 9 pages.
U.S. Appl. No. 13/229,624 / Applicant Initiated Interview Summary, dated Mar. 19, 2015, 3 pages.
U.S. Appl. No. 13/229,624 / Response After Final Action and Interview Summary, dated Mar. 27, 2015, 20 pages.
U.S. Appl. No. 13/229,624 / RCE and Amendments, dated Apr. 27, 2015, 17 pages.
U.S. Appl. No. 13/229,624 / Notice of Allowance and Fees, dated Jul. 6, 2015, 21 pages.
U.S. Appl. No. 13/229,624 / Issue Fee Payment, dated Sep. 28, 2015, 1 page.
U.S. Appl. No. 13/229,624 / Issue Notification, dated Oct. 14, 2015, 1 page.
U.S. Appl. No. 11/007,139 / Application filed Dec. 7, 2004, 90 pages.
U.S. Appl. No. 11/007,139 / Notice to File Missing Parts dated Jan. 19, 2005, 2 pages.
U.S. Appl. No. 11/007,139 / Response to Notice to File Missing Parts dated Apr. 1, 2005, 9 pages.
U.S. Appl. No. 11/007,139 / Preliminary Amendment dated Apr. 28, 2005, 146 pages.
U.S. Appl. No. 11/007,139 / Non-final Office Action dated May 14, 2007, 58 pages.
U.S. Appl. No. 11/007,139 / Amendment dated Oct. 15, 2007, 32 pages.
U.S. Appl. No. 11/007,139 / Supplemental Response dated Oct. 17, 2007, 7 pages.
U.S. Appl. No. 11/007,139 / Non-final Office Action dated Jan. 2, 2008 with Examiner's search results, 21 pages.
U.S. Appl. No. 11/007,139 / Amendment dated Apr. 2, 2008, 30 pages.
11/007,139 / Final Office Action dated Aug. 15, 2008, 30 pages.
U.S. Appl. No. 11/007,139 / Amendment dated Oct. 15, 2008, 26 pages.
U.S. Appl. No. 11/007,139 / Advisory Action dated Oct. 22, 2008, 26 pages.
U.S. Appl. No. 11/007,139 / RCE with Amendment dated Nov. 14, 2008, 32 pages.
U.S. Appl. No. 11/007,139 / Non-final Office Action dated Dec. 8, 2008, 24 pages.
U.S. Appl. No. 11/007,139 / Amendment dated May 8, 2009, 31 pages.
U.S. Appl. No. 11/007,139 / Final Office Action dated Aug. 4, 2009, 26 pages.
U.S. Appl. No. 11/007,139 / Amendment dated Dec. 4, 2009, 28 pages.
U.S. Appl. No. 11/007,139 / Advisory Action dated Dec. 14, 2009, 4 pages.

(56) References Cited

OTHER PUBLICATIONS

U.S. Appl. No. 11/007,139 / RCE with amendment dated Jan. 4, 2010, 27 pages.
U.S. Appl. No. 11/007,139 / Non-Final Office Action dated Jan. 27, 2010, 31 pages.
U.S. Appl. No. 11/007,139 / Response to Non-Final Office Action dated Apr. 27, 2010, 30 pages.
U.S. Appl. No. 11/007,139 / Office Action dated Jul. 20, 2010, 20 pages.
U.S. Appl. No. 11/007,139 / Office Action response dated Oct. 20, 2010, 33 pages.
U.S. Appl. No. 11/007,139 / Advisory Action dated Oct. 25, 2010, 2 pages.
U.S. Appl. No. 11/007,139 / Office Action dated Nov. 18, 2010, 24 pages.
U.S. Appl. No. 11/007,139 / Advisory Action dated Dec. 1, 2010, 4 pages.
U.S. Appl. No. 11/007,139 / Office Action response and Notice of Appeal dated Dec. 20, 2010, 29 pages.
U.S. Appl. No. 11/007,139 / Office Action dated Jan. 3, 2011, 24 pages.
U.S. Appl. No. 11/007,139 / Office Action response, dated May 3, 2011, 27 pages.
U.S. Appl. No. 11/007,139 / Final Office Action, dated Jul. 18, 2011, 23 pages.
U.S. Appl. No. 11/007,139 / Amendment after final dated Oct. 18, 2011, 30 pages.
U.S. Appl. No. 11,007,139 / Advisory Action and rule 312 amendment, dated Nov. 4, 2011, 4 pages.
U.S. Appl. No. 11,007,139 / Notice of Appeal dated Nov. 16, 2011, 1 page.
U.S. Appl. No. 11/007,139 / Appeal Brief filed May 1, 2012, 93 pages.
U.S. Appl. No. 11/007,139 / Notice of defective appeal brief, dated May 7, 2012, 3 pages.
U.S. Appl. No. 11/007,139 / Appeal Brief dated May 15, 2012 9 pages.
U.S. Appl. No. 11/007/139 / Examiner's answer to appeal brief, dated Aug. 20, 2012, 35 pages.
U.S. Appl. No. 11/007,139 / Reply Brief, dated Oct. 22, 2012, 29 pages.
U.S. Appl. No. 11/007,139 / Appeal Docketing Notice, dated Nov. 6, 2012, 2 pages.
U.S. Appl. No. 11/007,139 / Patent Board Decision, dated Jul. 24, 2015, 8 pages.
U.S. Appl. No. 11/006,320 / Application filed Dec. 6, 2004, 75 pages.
U.S. Appl. No. 11/006,320 / Response to Missing Parts and Preliminary Amendment dated May 9, 2005, 135 pages.
U.S. Appl. No. 11/006,320 / Office Action—Restriction Requirement dated Mar. 26, 2007, 7 pages.
U.S. Appl. No. 11/006,320 / Response to Restriction Requirement dated Apr. 27, 2007, 34 pages.
U.S. Appl. No. 11/006,320 / Notice of Non-Compliant Amendment dated Jul. 6, 2007, 3 pages.
U.S. Appl. No. 11/006,320 / Response to Non-Compliant Amendment dated Jul. 25, 2007, 33 pages.
U.S. Appl. No. 11/006,320 / Non-final Office Action dated Oct. 1, 2007, 24 pages.
U.S. Appl. No. 11/006,320 / Amendment dated Jan. 29, 2008, 45 pages.
U.S. Appl. No. 11/006,320 / Notice of Non-Compliant Amendment dated Apr. 8, 2008, 4 pages.
U.S. Appl. No. 11/006,320 / Amendment dated May 5, 2008, 44 pages.
U.S. Appl. No. 11/006,320 / Non-final Office Action dated Aug. 15, 2008, 33 pages.
U.S. Appl. No. 11/006,320 / Amendment dated Nov. 14, 2008, 40 pages.
U.S. Appl. No. 11/006,320 / Office Action—Shortened Statutory Period dated Jan. 27, 2009, 2 pages.
U.S. Appl. No. 11/006,320 / Amendment dated Apr. 27, 2009, 44 pages.
U.S. Appl. No. 11/006,320 / Final Office Action dated Jul. 29, 2009, 13 pages.
U.S. Appl. No. 11/006,320 / Amendment dated Nov. 30, 2009, 10 pages.
U.S. Appl. No. 11/006,320 / Non-final Office dated Dec. 4, 2009, 25 pages.
U.S. Appl. No. 11/006,320 / Response to Non-Final Office Action dated Feb. 23, 2010, 11 pages.
U.S. Appl. No. 11/006,320 / Final Office Action dated May 24, 2010, 11 pages.
U.S. Appl. No. 11/006,320 / Office Action response dated Aug. 24, 2010, 15 pages.
U.S. Appl. No. 11/006,320 / Notice of Allowance dated Sep. 17, 2010, 8 pages.
U.S. Appl. No. 11/006,320 / Examiner Interview Summary and supplemental Notice of Allowance dated Dec. 17, 2010, 9 pages.
U.S. Appl. No. 11/006,320 / Rule 312 Amendment and Issue Fee payment dated Dec. 17, 2010, 10 pages.
U.S. Appl. No. 11/006,320 / Issue Notification dated Jan. 12, 2011, 1 page.
U.S. Appl. No. 12/972,326 / Application as filed Dec. 17, 2010, 74 pages.
U.S. Appl. No. 12/972,326 / Filing receipt and Notice to File Missing Parts dated Jan. 6, 2011, 5 pages.
U.S. Appl. No. 12/972,326 / Response to Notice to File Missing parts dated Jan. 26, 2011, 14 pages.
U.S. Appl. No. 12/972,326 / Filing Receipt, dated Feb. 18, 2011, 3 pages.
U.S. Appl. No. 12/972,326 / Preliminary amendment dated May 20, 2011, 15 pages.
U.S. Appl. No. 12/972,326 / Notice of publication and non-compliant amendment dated Jun. 2, 2011, 3 pages.
U.S. Appl. No. 12/972,326 / Preliminary amendment dated Jul. 5, 2011, 21 pages.
U.S. Appl. No. 12/972,326 / Notice of additional fee due, dated Jul. 12, 2011, 2 pages.
U.S. Appl. No. 12/972,326 / Preliminary Amendment dated Aug. 10, 2011, 7 pages.
U.S. Appl. No. 12/972,326 / Non-Final Office Action, dated Feb. 23, 2012, 9 pages.
U.S. Appl. No. 12/972,326 / Abandonment, dated Sep. 18, 2012, 2 pages.
U.S. Appl. No. 13/014,677 / Application as filed Jan. 26, 2011, 90 pages.
U.S. Appl. No. 13/014,677 / Notice to file missing parts and filing receipt, dated Mar. 23, 2011, 5 pages.
U.S. Appl. No. 13/014,677 / Notice of Abandonment dated Nov. 29, 2011, 2 pages.
U.S. Appl. No. 11/006,848 / Application as filed Dec. 7, 2004, 59 pages.
U.S. Appl. No. 11/006,848 / Notice of File Missing Parts dated Mar. 18, 2005, 2 pages.
U.S. Appl. No. 11/006,848 / Response to Notice to File Missing Parts dated May 3, 2005, 101 pages.
U.S. Appl. No. 11/006,848 / Non-Final Office Action dated Apr. 4, 2007, 11 pages.
U.S. Appl. No. 11/006,848 / Response to Non-Final Office Action dated Oct. 3, 2007, 20 pages.
U.S. Appl. No. 11/006,848 / Supplemental Amendment dated Nov. 13, 2007, 4 pages.
U.S. Appl. No. 11/006,848 / Non-Final Office Action dated Feb. 5, 2008, 16 pages.
U.S. Appl. No. 11/006,848 / Response to Non-Final Office Action dated Aug. 4, 2008, 27 pages.
U.S. Appl. No. 11/006,848 / Final Office Action dated Dec. 2, 2008, 30 pages.
U.S. Appl. No. 11/006,848 / RCE filed May 4, 2009, 24 pages.
U.S. Appl. No. 11/006,848 / Notice of Allowance dated Jun. 11, 2009, 8 pages.

(56) References Cited

OTHER PUBLICATIONS

U.S. Appl. No. 11/006,848 / Issue fee dated Sep. 11, 2009, 10 pages.
U.S. Appl. No. 11/006,848 / Issue Notification dated Oct. 28, 2009, 1 page.
U.S. Appl. No. 12/573,829 / Application as filed Oct. 5, 2009, 64 pages.
U.S. Appl. No. 12/573,829 / Notice to File Missing Parts and Filing Receipt dated Oct. 20, 2009, 5 pages.
U.S. Appl. No. 12/573,829 / Preliminary Amendment dated Dec. 21, 2009, 17 pages.
U.S. Appl. No. 12/573,829 / Filing receipt dated Jan. 4, 2010, 5 pages.
U.S. Appl. No. 12/573,829 / Notice of Publication dated Apr. 15, 2010, 1 page.
U.S. Appl. No. 12/573,829 / Office Action dated Jun. 28, 2010, 35 pages.
U.S. Appl. No. 12/573,829 / Office Action Response dated Sep. 28, 2010, 22 pages.
U.S. Appl. No. 12/573,829 / Office Action dated Nov. 1, 2010, 29 pages.
U.S. Appl. No. 12/573,829 / Office Action Response dated Jan. 3, 2011, 29 pages.
U.S. Appl. No. 12/573,829 / Advisory Action dated Jan. 7, 2011, 3 pages.
U.S. Appl. No. 12/573,829 / Notice of Appeal dated Jan. 11, 2011, 1 page.
U.S. Appl. No. 12/573,829 / Appeal Brief, dated May 4, 2011, 68 pages.
U.S. Appl. No. 12/573,829 / Examiner's Answer to Appeal Brief, dated Jul. 21, 2011, 31 pages.
U.S. Appl. No. 12/573,829 / Reply brief dated Sep. 21, 2011, 17 pages.
U.S. Appl. No. 12/573,829 / Reply brief noted Oct. 5, 2011, 2 pages.
U.S. Appl. No. 12/573,829 / Appeal Docketing notice Oct. 11, 2011, 2 pages.
U.S. Appl. No. 12/573,829 / Appeal Board Decision, dated May 9, 2014, 10 pages.
U.S. Appl. No. 12/573,829 / Request for continued examination, dated Jul. 9, 2014, 19 pages.
U.S. Appl. No. 12/573,829 / Non-Final Rejection and Examiner's Search, dated Apr. 28, 2015, 22 pages.
U.S. Appl. 12/573,829 / Amendment/Req. Reconsideration After Non-Final Rejection, filed Jul. 27, 2015, 21 pages.
U.S. Appl. No. 12/573,829 / Final Rejection and Examiner search, dated Sep. 15, 2015, 17 pages.
U.S. Appl. No. 12/573,829 / Response After Final Action, dated Nov. 16, 2015, 17 pages.
U.S. Appl. No. 12/573,829 / Advisory Action, dated Dec. 2, 2015, 4 pages.
U.S. Appl. No. 12/573,829 / Request for Continued Examination and Amendments, dated Dec. 14, 2015, 17 pages.
U.S. Appl. 11/006,841 / Application as filed Dec. 7, 2004, 63 pages.
U.S. Appl. No. 11/006,841 / Notice to file missing parts dated Jan. 10, 2005, 2 pages.
U.S. Appl. No. 11/006,841 / Response to Notice to file missing parts and preliminary amendment dated Apr. 14, 2005, 105 pages.
U.S. Appl. No. 11/006,841 / Non-Final OA dated Apr. 6, 2007, 16 pages.
U.S. Appl. No. 11/006,841 / Response to Non-Final OA dated Sep. 6, 2007, 63 pages.
U.S. Appl. No. 11/006,841 / Restriction Requirement dated Nov. 27, 2007, 5 pages.
U.S. Appl. No. 11/006,841 / Restriction Requirement response dated Dec. 27, 2007, 36 pages.
U.S. Appl. No. 11/006,841 / Restriction Requirement dated Mar. 17, 2008, 9 pages.
U.S. Appl. No. 11/006,841 / Response to Restriction Requirement dated Jul. 17, 2008, 33 pages..
U.S. Appl. No. 11/006,841 / Final Office Action dated Oct. 29, 2008, 54 pages.
U.S. Appl. No. 11/006,841 / Response to Final Office Action dated Dec. 29, 2008, 45 pages.
U.S. Appl. No. 11/006,841 / Advisory Action dated Jan. 6, 2009, 3 pages.
U.S. Appl. No. 11/006,841 / RCE mailed Apr. 23, 2009, 48 pages.
U.S. Appl. No. 11/006,841 / Supplemental Response dated Jun. 26, 2009, 34 pages.
U.S. Appl. No. 11/006,841 / Notice of Allowance dated Jun. 29, 2009, 40 pages.
U.S. Appl. No. 11/006,841 / Issue Fee dated Sep. 29, 2009, 4 pages.
U.S. Appl. No. 11/006,841 / Issue Notification dated Nov. 11, 2009, 1 page.
U.S. Appl. No. 12/578,411 / Continuation application filed Oct. 13, 2009, 75 pages.
U.S. Appl. No. 12/578,411 / Notice of Missing Parts dated Oct. 28, 2009, 6 pages.
U.S. Appl. No. 12/578,411 / Response to Missing Parts dated Dec. 28, 2009, 25 pages.
U.S. Appl. No. 12/578,411 / Filing Receipt dated Jan. 7, 2010, 3 pages.
U.S. Appl. No. 12/578,411 / Notice of Publication dated Apr. 15, 2010, 1 page.
U.S. Appl. No. 12/578,411 / Restriction requirement dated Jun. 8, 2011, 6 pages.
U.S. Appl. No. 12/578,411 / Response to restriction requirement dated Jul. 6, 2011, 19 pages.
U.S. Appl. No. 12/578,411 / Non-Final Office Action, dated Aug. 23, 2011, 19 pages.
U.S. Appl. No. 12/578,411 / Non-Final Office Action response dated Dec. 22, 2011, 38 pages.
U.S. Appl. No. 12/578,411 / Final Rejection dated Jan. 20, 2012, 16 pages.
U.S. Appl. No. 12/578,411 / Amendment, dated May. 21, 2012, 23 pages.
U.S. Appl. No. 12/578,411 / Advisory Action, dated May 31, 2012, 4 pages.
U.S. Appl. No. 12/578,411 / RCE, mailed Jun. 12, 2012, 38 pages.
U.S. Appl. No. 12/578,411 / Notice of Allowance, dated Aug. 19, 2013, 19 pages.
U.S. Appl. No. 12/578,411 / Issue fee payment and Rule 312 amendment, dated Nov. 14, 2013, 14 pages.
U.S. Appl. No. 12/578,411 / Examiner response to rule 312 amendment, dated Nov. 19, 2013, 2 pages.
U.S. Appl. No. 12/578,411 / Response to Amendment under rule 312, dated Dec. 3, 2013, 3 pages.
U.S. Appl. No. 12/578,411 / Issue Notification, dated Dec. 18, 2013, 1 page.
U.S. Appl. No. 14/086,837 / Application as filed Nov. 21, 2013, 68 Pages.
U.S. Appl. No. 14/186,837 / Notice of File Missing Parts, dated Dec. 12, 2013, 5 Pages.
U.S. Appl. No. 14/086,837 / Applicant Resonse to Pre-Exam Formalities Notice, dated Jun. 11, 2014, 26 Pages.
U.S. Appl. No. 14/086,837 / Notice of Publication, dated Sep. 25, 2014, 4 Pages.
U.S. Appl. No. 14/086,837 / Terminal Disclaimer, filed Nov. 14, 2014, 1 page.
U.S. Appl. No. 14/086,837 / Examiner's search strategy and results, dated Dec. 2, 2014, 9 pages.
U.S. Appl. No. 14/086,837 / Notice of Allowance and Fees, dated Dec. 2, 2014, 17 pages.
U.S. Appl. No. 14/086,837 / Amendment After Notice of Allowance, dated Feb. 27, 2015, 9 pages.
U.S. Appl. No. 14/086,837 / Issue Fee Payment, dated Feb. 27, 2015, 1 page.
U.S. Appl. No. 14/086,837 / Issue Notification, dated May 6, 2015, 1 page.
U.S. Appl. No. 14/635,836 / Application as filed Mar. 2, 2015, 70 pages.
U.S. Appl. No. 14/635,836 / Filing Receipt, dated Mar. 12, 2015, 3 pages.
U.S. Appl. No. 14/635,836 / Notice to File Missing Parts, dated Mar. 12, 2015, 2 pages.

(56) References Cited

OTHER PUBLICATIONS

U.S. Appl. No. 14/635,836 / Applicant Response to Pre-Exam Formalities Notice, dated May 12, 2015, 40 pages.
U.S. Appl. No. 14/635,836 / Filing Receipt, dated May 19, 2015, 3 pages.
U.S. Appl. No. 14/635,836 / Notice of Publication, dated Aug. 27, 2015, 1 page.
U.S. Appl. No. 14/635,836 / Electronic Terminal Disclaimer Approved and Filed, Nov. 13, 2015, 3 pages.
U.S. Appl. No. 11/006,440 / Application as filed Dec. 6, 2004, 85 pages.
U.S. Appl. No. 11/006,440 / Notice to file missing parts dated Jan. 11, 2005, 2 pages.
U.S. Appl. No. 11/006,440 / Response to Notice to file missing parts dated Mar. 15, 2005, 8 pages.
U.S. Appl. No. 11/006,440 / Preliminary Amendment dated Apr. 28, 2005, 140 pages.
U.S. Appl. No. 11/006,440 / Preliminary Amendment and Substitute Specification dated Oct. 10, 2006, 139 pages.
U.S. Appl. No. 11/006,440 / Restriction Requirement dated Mar. 29, 2007, 5 pages.
U.S. Appl. No. 11/006,440 / Response to Restriction Requriement dated Apr. 30, 2007, 42 pages.
U.S. Appl. No. 11/006,440 / Non-Final Office Action dated Jun. 21, 2007, 15 pages.
U.S. Appl. No. 11/006,440 / Response to Non-Final Office Action dated Nov. 20, 2007, 42 pages.
U.S. Appl. No. 11/006,440 / Final Office Action dated Feb. 6, 2008, 13 pages.
U.S. Appl. No. 11/006,440 / Response to Final Office Action dated Apr. 7, 2008, 34 pages.
U.S. Appl. No. 11/006,440 / Advisory Action dated May 9, 2008, 3 pages.
U.S. Appl. No. 11/006,440 / Notice of appeal dated Aug. 4, 2008, 1 page.
U.S. Appl. No. 11/006,440 / RCE mailed Nov. 4, 2008, 39 pages.
U.S. Appl. No. 11/006,440 / Final Office Action dated Jan. 23, 2009, 22 pages.
U.S. Appl. No. 11/006,440 / Amendment after Final dated Apr. 23, 2009, 34 pages.
U.S. Appl. No. 11/006,440 / Supplemental Amendment dated Jul. 17, 2009, 29 pages.
U.S. Appl. No. 11/006,440 / Notice of Allowance dated Jul. 31, 2009, 15 pages.
U.S. Appl. No. 11/006,440 / Examiner's Amendment and Reasons for Allowance dated Sep. 3, 2009, 9 pages.
U.S. Appl. No. 11/006,440 / Issue Fee dated Nov. 2, 2009, 12 pages.
U.S. Appl. No. 11/006,440 / Issue Notification dated Dec. 2, 2009, 1 page.
U.S. Appl. No. 12/627,816 / Continuation application dated Nov. 30, 2009, 95 pages.
U.S. Appl. No. 12/627,816 / Notice of Missing Parts dated Dec. 15, 2009, 2 pages.
U.S. Appl. No. 12/627,816 / Response to Missing Parts dated Apr. 12, 2010, 21 pages.
U.S. Appl. No. 12/627,816 / Filing Receipt dated Apr. 20, 2010, 3 pages.
U.S. Appl. No. 12/627,816 / Notice of Publication dated Jul. 29, 2010, 1 page.
U.S. Appl. No. 12/627,816 / Non-Final OA, dated May 5, 2011, 19 pages.
U.S. Appl. No. 12/627,816 / Non-Final OA response, dated Nov. 7, 2011, 12 pages.
U.S. Appl. No. 12/627,816 / Filing Rejection dated Nov. 17, 2011, 18 pages.
U.S. Appl. No. 12/627,816 / RCE mailed Feb. 17, 2012, 20 pages.
U.S. Appl. No. 12/627,816 / Terminal disclaimer review, dated Mar. 7, 2012 1 page.
U.S. Appl. No. 12/627,816 / Notice of Allowance, dated Aug. 1, 2013, 16 pages.
U.S. Appl. No. 12/627,816 / Issue fee payment and Rule 312 amendment, dated Nov. 1, 2013, 14 pages.
U.S. Appl. No. 12/627,816 /Examiner response to rule 312 amendment, dated Nov. 13, 2013, 2 pages.
U.S. Appl. No. 12/627,816 / Issue Notification, dated Nov. 26, 2013, 1 page.
U.S. Appl. No. 14/086,808 / Application as filed Nov. 21, 2013, 87 Pages.
U.S. Appl. No. 14/086,808 / Notice to File Missing Parts and Filing Receipt, dated Dec. 11, 2013, 5 Pages.
U.S. Appl. No. 14/086,808 / Applicant Response to Pre-Exam Formalities Notice, dated Jun. 11, 2014, 53 Pages.
U.S. Appl. No. 14/086,808 / Filing receipt, dated Jun. 17, 2014, 3 Pages.
U.S. Appl. No. 14/086,808 / Notice of Publication, dated Sep. 25, 2014, 1 Page.
U.S. Appl. No. 14/086,808 / Terminal Disclaimer, Filed Oct. 24, 2014, 2 pages.
U.S. Appl. No. 14/086,808 / Terminal Disclaimer Review Decision, dated Oct. 29, 2014, 1 page.
U.S. Appl. No. 14/086,808 / Terminal Disclaimer, Filed Nov. 4, 2014, 2 pages.
U.S. Appl. No. 14/086,808 / Terminal Disclaimer Review Decision, dated Nov. 13, 2014, 1 page.
U.S. Appl. No. 14/086,808 Examiner's search strategy and results, dated Nov. 17, 2014, 5 pages.
U.S. Appl. No. 14/086,808 / Notice of Allowance and fees, dated Nov. 17, 2014, 16 pages.
U.S. Appl. No. 14/086,808 / Issue Fee Payment and Rule 312 amendment, dated Feb. 17, 2015, 1 page.
U.S. Appl. No. 14/086,808 / Amendment After Notice of Allowance, dated Feb. 17, 2015, 17 pages.
U.S. Appl. No. 14/086,808 / Response to Amendment under Rule 312, Feb. 20, 2015, 2 pages.
U.S. Appl. No. 14/086,808 / Issue Notification, Mar. 18, 2015, 1 page.
U.S. Appl. No. 14/625,473 / Application as filed Feb. 18, 2015, 92 pages.
U.S. Appl. No. 14/625,473 / Filing Receipt, dated Mar. 18, 2015, 3 pages.
U.S. Appl. No. 14/625,473 / Response to Pre-Exam Formalities Notice and Preliminary Amendment, dated May 18, 2015, 28 pages.
U.S. Appl. No. 14/625,473 / Filing Receipt, dated May 20, 2015, 3 pages.
U.S. Appl. No. 14/625,473 / Notice of Publication, dated Aug. 27, 2015, 1 page.
U.S. Appl. No. 14/625,473 / Electronic Terminal Disclaimer Filed and Approved, Nov. 13, 2015, 3 pages.
U.S. Appl. No. 11/006,446 / Application filed Dec. 6, 2004, 91 pages.
U.S. Appl. No. 11/006,446 / Notice of Missing Parts dated Jan. 24, 2005, 3 pages.
U.S. Appl. No. 11/006,446 / Response to Notice to File Missing Parts dated Mar. 29, 2005, 8 pages.
U.S. Appl. No. 11/006,446 / Preliminary Amendment dated Apr. 28, 2005, 118 pages.
U.S. Appl. No. 11/006,446 / Office Action—Restriction Requirement dated Apr. 4, 2007, 5 pages.
U.S. Appl. No. 11/006,446 / Response to Office Action—Restriction Requirement dated May 3, 2007, 6 pages.
U.S. Appl. No. 11/006,446 / Non-final Office Action dated Jul. 26, 2007, 45 pages.
U.S. Appl. No. 11/006,446 / Amendment filed Nov. 26, 2007, 38 pages.
U.S. Appl. No. 11/006,446 / Non-final Office Action dated Feb. 20, 2008, 67 pages.
U.S. Appl. No. 11/006,446 / Amendment dated Jul. 21, 2008, 33 pages.
U.S. Appl. No. 11/006,446 / Final Office Action dated Oct. 28, 2008, 49 pages.
U.S. Appl. No. 11/006,446 / Amendment dated Dec. 29, 2008, 33 pages.

(56) References Cited

OTHER PUBLICATIONS

U.S. Appl. No. 11/006,446 / Advisory Action dated Jan. 7, 2009, 4 pages.
U.S. Appl. No. 11/006,446 / RCE with Amendment dated Apr. 28, 2009, 38 pages.
U.S. Appl. No. 11/006,446 / Non-final Office Action dated Jul. 7, 2009, 41 pages.
U.S. Appl. No. 11/006,446 / Examiner Interview Summary and Search Results dated Oct. 26, 2009, 6 pages.
U.S. Appl. No. 11/006,446 / Amendment dated Dec. 7, 2009, 33 pages.
U.S. Appl. No. 11/006,446 / Examiner Interview Summary dated Mar. 19, 2010. 4 pages.
U.S. Appl. No. 11/006,446 / Notice of Allowance/Allowability dated Mar. 19, 2010, 29 pages.
U.S. Appl. No. 11/006,446 / Issue Fee Payment and 312 Amendment dated Jun. 21, 2010, 23 pages.
U.S. Appl. No. 11/006,446 / Rule 312 Amendment dated Aug. 19, 2010, 2 pages.
U.S. Appl. No. 11/006,446 / Formal drawings dated Aug. 25, 2010, 29 pages.
U.S. Appl. No 11/006,446 / Issue Notification dated Sep. 1, 2010, 1 page.
U.S. Appl. No 12/830,236 / Divisional Application filed Jul. 2, 2010, 103 pages.
U.S. Appl. No 12/830,236 / Notice to File Corrected Application Papers dated Jul. 16, 2010, 5 pages.
U.S. Appl. No 12/830,236 / Response to Notice to File Corrected Application Papers dated Aug. 25, 2010, 32 pages.
U.S. Appl. No 12/830,236 / Filing receipt dated Sep. 3, 2010, 3 pages.
U.S. Appl. No 12/830,236 / Notice of Publication dated Dec. 16, 2010, 1 page.
U.S. Appl. No 12/830,236 / Restriction requirement dated Mar. 18, 2011, 6 pages.
U.S. Appl. No 12/830,236 / Retriction requirement response, dated Apr. 18, 2011, 5 pages.
U.S. Appl. No 12/830,236 / Non-Final Office Action, dated May 11, 2011, 10 pages.
U.S. Appl. No 12/830,236 / Response to Non-Final Office Action dated Jul. 6, 2011, 18 pages.
U.S. Appl. No 12/830,236 / Final Office Action, dated Oct. 14, 2011, 18 pages.
U.S. Appl. No 12/830,236 / Amendment after final, filed Jan. 17, 2012, 26 pages.
U.S. Appl. No 12/830,236 / Advisory Action, dated Feb. 8, 2012, 6 pages.
U.S. Appl. No. 12/830,236 / Notice of Appeal dated Mar. 8, 2012, 3 pages.
U.S. Appl. No. 12/830,236 / RCE, filed Jun. 5, 2012, 23 pages.
U.S. Appl. No. 12/830,236 / Non-Final Office Action, dated Jul. 31, 2012, 18 pages.
U.S. Appl. No. 12/830,236 / Amendment, dated Nov. 1, 2012, 27 pages.
U.S. Appl. No. 12/830,236 / Final Office Action, dated Feb. 27, 2013, 35 pages.
U.S. Appl. No. 12/830,236 / Response after final, dated Jun. 27, 2013, 36 pages.
U.S. Appl. No. 12/830,236 / Advisory action, dated Jul. 12, 2013, 4 pages.
U.S. Appl. No. 12/830,236 / Notice of Appeal, dated Jul. 19, 2013, 2 pages.
U.S. Appl. No. 12/830,236 / Appeal brief, field Sep. 18, 2013, 44 pages.
U.S. Appl. No. 12/830,236 / Appeal brief, filed Sep. 18, 2013, 44 pages.
U.S. Appl. No. 12/830,236 / Examiners answer to appeal brief, dated Dec. 18, 2013, 35 pages.
U.S. Appl. No. 12/830,236 / Reply Brief as filed Feb. 18, 2014, 16 Pages.
U.S. Appl. No. 12/830,236 / Appeal Docketing Notice, dated Mar. 21, 2014, 2 Pages.
U.S. Appl. No. 11/385,257 / Application filed Mar. 20, 2006, 118 pages.
U.S. Appl. No. 11/385,257 / Notice of Missing Parts dated May 3, 2006, 2 pages.
U.S. Appl. No. 11/385,257 / Response to Missing Parts dated Aug. 3, 2006, 46 pages.
U.S. Appl. No. 11/385,257 / Notice of Publication dated Nov. 30, 2006, 1 page.
U.S. Appl. No. 11/385,257 / Non-final Office Action dated Apr. 29, 2008, 44 pages.
U.S. Appl. No. 11/385,257 / Amendment dated Jul. 29, 2008, 29 pages.
U.S. Appl. No. 11/385,257 / Final Office Action dated Dec. 9, 2008, 47 pages.
U.S. Appl. No. 11/385,257 / RCE with Amendment dated May 11, 2009, 38 pages.
U.S. Appl. No. 11/385,257 / Supplemental Amendment dated May 26, 2009, 32 pages.
U.S. Appl. No. 11/385,257 / Notice of Non-Compliant Amendment dated Jun. 1, 2009, 3 pages.
U.S. Appl. No. 11/385,257 / Amendment dated Jun. 30, 2009, 34 pages.
U.S. Appl. No. 11/385,257 / Non-final Office Action dated Sep. 14, 2009, 60 pages.
U.S. Appl. No. 11/385,257 / Response to Non-final Office Action dated Jan. 13, 2010, 34 pages.
U.S. Appl. No. 11/385,257 / Non-final Office Action dated Apr. 12, 2010, 47 pages.
U.S. Appl. No. 11/385,257 / RCE mailed Aug. 12, 2010. 35 pages.
U.S. Appl. No. 11/385,257 / Office Action dated Sep. 30, 2010, 39 pages.
U.S. Appl. No. 11/385,257 / Office Action response, dated Mar. 29, 2011, 31 pages.
U.S. Appl. No. 11/385,257 / Final Rejection dated Jun. 1, 2011, 40 pages.
U.S. Appl. No. 11/385,257 / Request for continued Examination dated Nov. 1, 2011, 30 pages.
U.S. Appl. No. 11/385,257 / Non-Final Office Action, dated Jan. 9, 2012, 40 pages.
U.S. Appl. No. 11/385,257 / Amendment, dated Apr. 6, 2012, 30 pages.
U.S. Appl. No. 11/385,257 / Notice of allowance and Examiner interview summary, dated Jun. 22, 2012, 36 pages.
U.S. Appl. No. 11/385,257 / Office communication concerning previous IDS filing, dated Oct. 4, 2012, 4 pages.
U.S. Appl. No. 11/385,257 / Miscellaneous Communication to Applicant, dated Oct. 15, 2012, 3 pages.
U.S. Appl. No. 11/385,257 / Rule 312 Amendment, dated Dec. 12, 2012, 10 pages.
U.S. Appl. No. 11/385,257 / Issue Notification, dated Dec. 22, 2012, 1 page.
U.S. Appl. No. 13/625,812 / Application as filed on Sep. 24, 2012, 123 pages.
U.S. Appl. No. 13/625,812 / Notice to file missing parts, dated Oct. 15, 2012, 6 pages.
U.S. Appl. No. 13/625,812 / Response to Notice to file missing parts and preliminary amendment, dated Mar. 8, 2013, 47 pages.
U.S. Appl. No. 13/625,812 / Notice of incomplete reply, dated Mar. 15, 2013, 3 pages.
U.S. Appl. No. 13/625,812 / Response to incomplete reply notice, dated Apr. 2, 2013, 5 pages.
U.S. Appl. No. 13/625,812 / Non-Final office action, dated Jul. 26, 2013, 29 pages.
U.S. Appl. No. 13/625,812 / Publication notice, dated Aug. 1, 2013, 1 page.
U.S. Appl. No. 13/625,812 / Response to non-final office action, dated Oct. 9, 2013, 15 pages.
U.S. Appl. No. 13/625,812 / Final rejection, dated Dec. 3, 2013, 28 pages.
U.S. Appl. No. 13/625,812 / Response After Final Action, dated Apr. 1, 2014, 1 Page.

(56) References Cited

OTHER PUBLICATIONS

U.S. Appl. No. 13/625,812 / Advisory Action (PTOL-303), dated Apr. 9, 2014, 3 Pages.
U.S. Appl. No. 13/625,812 / Notice of Appeal, dated May 5, 2014, 1 Page.
U.S. Appl. No. 13/625,812 / Requst for Continued Examination, dated Aug. 4, 2014, 18 Pages.
U.S. Appl. No. 13/625,812 / Request for Corrected Filing Receipt, dated Aug. 21, 2014, 6 Pages.
U.S. Appl. No. 13/625,812 / Filing Receipt, dated Aug. 27, 2014, 3 Pages.
U.S. Appl. No. 13/625,812 / Notice of Allowance and Fees, dated Dec. 9, 2014, 20 pages.
U.S. Appl. No. 13/625,812 / Filing Receipt, dated Feb. 2, 2015, 3 pages.
U.S. Appl. No. 13/625,812 / Filing Receipt, dated Feb. 6, 2015, 3 pages.
U.S. Appl. No. 13/625,812 / Terminal Disclaimer Filed Mar. 2, 2015, 1 page.
U.S. Appl. No. 13/625,812 / Post Allowance Arguments/Amendments, dated Mar. 6, 2015, 6 pages.
U.S. Appl. No. 13/625,812 / Amendment After Notice of Allowance, dated Mar. 9, 2015, 3 pages.
U.S. Appl. No. 13/625,812 / Issue Fee Payment, dated Mar. 9, 2015, 1 page.
U.S. Appl. No. 13/625,812 / Terminal Disclaimer Review Decision, dated Mar. 12, 2015.
U.S. Appl. No. 14/641,735 / Application as filed Mar. 9, 2015, 126 pages.
U.S. Appl. No. 14/641,735 / Filing Receipt, dated Mar. 20, 2015, 3 pages.
U.S. Appl. No. 14/641,735 / Notice to File Missing Parts, dated Mar. 20, 2015, 2 pages.
U.S. Appl. No. 14/641,735 / Notice of Incomplete Reply, dated Jun. 26, 2015, 2 pages.
U.S. Appl. No. 14/641,735 / Applicant Response to Pre-Exam Formalities Notice and Amendments, dated Jul. 8, 2015, 32 pages.
U.S. Appl. No. 14/641,735 / Electronic Terminal Disclaimer, filed Aug. 27, 2015, 3 pages.
U.S. Appl. No. 14/641,735 / Notice of Publication, Oct. 29, 2015, 1 page.
U.S. Appl. No. 11/319,758 / Application filed Dec. 27, 2005, 79 pages.
U.S. Appl. No. 11/319,758 / Notice of Missing Parts dated Feb. 1, 2006, 2 pages.
U.S. Appl. No. 11/319,758 / Response to Missing Parts dated Jul. 3, 2006, 15 pages.
U.S. Appl. No. 11/319,758 / Non-final Office Action dated Nov. 12, 2008, 46 pages.
U.S. Appl. No. 11/319,758 / Amendment dated May 12, 2009, 40 pages.
U.S. Appl. No. 11/319,758 / Final Office Action dated Aug. 3, 2009, 39 pages.
U.S. Appl. No. 11/319,758 / RCE dated Jan. 4, 2010, 45 pages.
U.S. Appl. No. 11/319,758 / Non-Final Office Action dated Mar. 30, 2010, 39 pages.
U.S. Appl. No. 11/319,758 / Office Action response dated Jul. 29, 2010, 30 pages.
U.S. Appl. No. 11/319,758 / Final Office Action dated Oct. 28, 2010, 31 pages.
U.S. Appl. No. 11/319,758 / Request for Continued Examination, dated Mar. 28, 2011, 32 pages.
U.S. Appl. No. 11/319,758 / Non-Final office action dated Jun. 3, 2011, 31 pages.
U.S. Appl. No. 11/319,758 / Non-Final Office Action Response dated Nov. 3, 2011, 29 pages.
U.S. Appl. No. 11/319,758 / Final Office Action, dated Jan. 17, 2012, 22 pages.
U.S. Appl. No. 11/319,758 / Amendment after final, dated May 17, 2012, 34 pages.
U.S. Appl. No. 11/319,758 / Advisory Action, dated Jun. 20, 2012, 3 pages.
U.S. Appl. No. 11/319,758 / Amendment after final, dated Jun. 28, 2012, 29 pages.
U.S. Appl. No. 11/319,758 / Notice of Allowance and examiner's interview summary, dated Jul. 17, 2012, 10 pages.
U.S. Appl. No. 11/319,758 / Issue Fee payment, Rule 312 and Miscellaneous Communication, dated Oct. 12, 2012, 12 pages.
U.S. Appl. No. 11/319,758 / Issue Notification, dated Oct. 31, 2012, 1 page.
U.S. Appl. No. 13/632,581 / Application as filed Oct. 1, 2012, 88 Pages.
U.S. Appl. No. 13/632,581 / Notice to File Missing Parts and Filing Receipt, dated Oct. 22, 2012, 27 Pages.
U.S. Appl. No. 13/632,581 / Filing Receipt, dated Mar. 5, 2004, 3 Pages.
U.S. Appl. No. 13/632,581 / Notice of Publication, dated Jun. 13, 2013, 1 Page.
U.S. Appl. No. 13/632,581 / Non-Final Office Action, dated Jul. 3, 2013, 22 Pages.
U.S. Appl. No. 13/632,581 / Non-Final Office Action, dated Jul. 11, 2013, 22 Pages.
U.S. Appl. No. 13/632,581 / Final Office Action, dated Dec. 18, 2013, 27 Pages.
U.S. Appl. No. 13/632,581 / Response After Final Action, dated Mar. 18, 2014, 37 Pages.
U.S. Appl. No. 13/632,581 / Advisory Action (PTOL-303), dated Apr. 3, 2014, 4 Pages.
U.S. Appl. No. 13/632,581 / Notice of Appeal dated Jul. 17, 2014, 2 Pages.
U.S. Appl. No. 13/632,581 / Request for Continued Examination, dated Jul. 16, 2014, 23 Pages.
U.S. Appl. No. 13/632,581 / Notice Non-Compliant Amendment, dated Oct. 20, 2014, 5 pages.
U.S. Appl. No. 13/632,581 / Amendment/Req Reconsideration after Non-Final Reject, dated Nov. 4, 2014, 16 pages.
U.S. Appl. No. 13/632,581 / Non-Final Rejection, dated Jan. 27, 2015, 16 pages.
U.S. Appl. No. 13/632,581 / Amendment/Req Reconsideration Non-Final Rejection and Amendments, dated Apr. 20, 2015, 24 pages.
U.S. Appl. No. 13/632,581 / Final Rejection, dated Jul. 20, 2015, 21 pages.
U.S. Appl. No. 13/632,581 / After Final Consideration Request and Response, Sep. 21, 2015, 28 pages.
U.S. Appl. No. 13/632,581 / Advisory Action and After Final Decision, Oct. 2, 2015, 18 pages.
U.S. Appl. No. 13/632,581 / RCE and Amendments, Nov. 30, 2015, 55 pages.
U.S. Appl. No. 13/632,581 / Notice of Allowance and Fees, dated Dec. 17, 2015, 5 pages.
U.S. Appl. No. 11/006,842 / Application as filed on Dec. 7, 2004, 58 pages.
U.S. Appl. No. 11/006,842 / Notice to file missing parts Jan. 10, 2005, 2 pages.
U.S. Appl. No. 11/006,842 / Response to Notice to file missing parts dated Apr. 1, 2005, 7 pages.
U.S. Appl. No. 11/006,842 / Preliminary Amendment dated May 2, 2005, 93 pages.
U.S. Appl. No. 11/006,842 / Restriction Requirement dated Jan. 23, 2008, 5 pages.
U.S. Appl. No. 11/006,842 / Response to Restriction Requirement dated Feb. 25, 2008, 25 pages.
U.S. Appl. No. 11/006,842 / Restriction Requirement dated May 13, 2008, 5 pages.
U.S. Appl. No. 11/006,842 / Response to Restriction Requirement Aug. 13, 2008, 24 pages.
U.S. Appl. No. 11/006,842 / Non-Final Office Action dated Nov. 3, 2008.
U.S. Appl. No. 11/006,842 / Response to Non-Final Office Action dated May 4, 2009, 35 pages.
U.S. Appl. No. 11/006,842 / Supplemental Response dated Jul. 17, 2009, 23 pages.

(56) References Cited

OTHER PUBLICATIONS

U.S. Appl. No. 11/006,842 / Notice of Allowance dated Jul. 27, 2009, 13 pages.
U.S. Appl. No. 11/006,842 / Issue Fee dated Oct. 27, 2009, 1 page.
U.S. Appl. No. 11/006,842 / Issue notification dated Nov. 18, 2009, 1 page.
U.S. Appl. No. 12/612,450 / Continuation application dated Nov. 5, 2009, 63 pages.
U.S. Appl. No. 12/613,450 / Notice of Missing Parts dated Nov. 18, 2009, 2 pages.
U.S. Appl. No. 12/613,450 / Preliminary Amendment and Response to Missing Parts dated Jan. 19, 2010, 16 pages.
U.S. Appl. No. 12/613,450 / Filing receipt dated Jan. 27, 2010, 3 pages.
U.S. Appl. No. 12/613,450 / Notice of Publication dated May 6, 2010, 1 page.
U.S. Appl. No. 12/613,450 / Restriction requirement dated Jun. 10, 2010, 5 pages.
U.S. Appl. No. 12/613,450 / Response to restriction requirement dated Jul. 6, 2011, 17 pages.
U.S. Appl. No. 12/613,450 / Non-Final Office Action, dated Aug. 25, 2011, 15 pages.
U.S. Appl. No. 12/613,450 / Non-Final OA response dated Dec. 27, 2011, 28 pages.
U.S. Appl. No. 12/613,450 / Final rejection, dated Feb. 14, 2012, 14 pages.
U.S. Appl. No. 12/613,450 / Amendment after final, dated Jun. 8, 2012, 23 pages.
U.S. Appl. No. 12/613,450 / Advisory Action, dated Jun. 20, 2012, 4 pages.
U.S. Appl. No. 12/613,450 / RCE, mailed Jul. 12, 2012, 25 pages.
U.S. Appl. No. 12/613,450 / Notice of Allowance, dated Oct. 7, 2013, 20 pages.
U.S. Appl. No. 12/613,450 /Electronic Terminal Disclaimer filed and approved, Jan. 2, 2014, 2 pages.
U.S. Appl. No. 12/612/450 / Amendment After Final or Under 37CFR 1.312, Initialed by the Examiner, dated Jan. 14, 2014 2 Pages.
U.S. Appl. No. 12/613/450 / Issue Notification, dated Jan. 22, 2014, 1 Page.
U.S. Appl. No. 14/149,749 / Application af filed Jan. 7, 2014, 59 Pages.
U.S. Appl. No. 14/149,749 / Notice of File Missing Parts and Filing Receipt, dated Jan. 23, 2014, 6 Pages.
U.S. Appl. No. 14/149,749 / Applicant Response to Pre-exam Formalities Notice, dated May 23, 2014 12 Pages.
U.S. Appl. No. 14/149,749 / Applicant Response to Pre-Exam Formalities Notice, dated Aug. 25, 2014, 103 Pages.
U.S. Appl. No. 14/149,749 / Filing Receipt, dated Sep. 4, 2014, 3 Pages.
U.S. Appl. No. 14/149,749 / Notice of Publication, dated Dec. 11, 2014, 1 page.
U.S. Appl. No. 14/149,749 / Electronic Terminal Disclaimer Filed and Approved Feb. 23, 2015.
U.S. Appl. No. 14/149,749 / Examiner Initiated Interview Summary, dated Feb. 24, 2015, 2 pages.
U.S. Appl. No. 14/149,749 / Notice of Allowance and Fees and Examiner Search, dated Apr. 17, 2015, 30 pages.
U.S. Appl. No. 14/149,749 / Amendment after Notice of Allowance, filed May 27, 2015, 10 pages.
U.S. Appl. No. 14/149,749 / Issue Fee Payment, dated May 27, 2015, 1 page.
U.S. Appl. No. 14/149,749 / Electronic Terminal Disclaimer Filed and Approved, May 27, 2015, 3 pages.
U.S. Appl. No. 14/149,749 / Response to Amendment under Rule 312, dated May 29, 2015, 1 page.
U.S. Appl. No. 14/149,749 / Response to Amendment under Rule 312, dated Jun. 1, 2015, 3 pages.
U.S. Appl. No. 14/149,749 / Issue Notification, dated Jun. 17, 2015, 1 page.
U.S. Appl. No. 14/726,192 / Application as Filed May 29, 2015, 39 pages.
U.S. Appl. No. 14/726,192 / Filing Receipt, dated Jun. 9, 2015, 3 pages.
U.S. Appl. No. 14/726,192 / Notice to File Missing Parts, dated Jun. 9, 2015, 2 pages.
U.S. Appl. No. 14/726,192 / Applicant Response to Pre-Exam Formalities Notice and Amendments, filed Aug. 12, 2015, 114 pages.
U.S. Appl. No. 14/726,192 / Filing Receipt, dated Aug. 20, 2015, 3 pages.
U.S. Appl. No. 14/726,192 / Electronic Terminal Disclaimer Filed and Approved, Nov. 20, 2015, 3 pages.
U.S. Appl. No. 14/726,192 / Notice of Publication, Nov. 27, 2015, 1 page.
U.S. Appl. No. 11/320,538 / Application filed Dec. 27, 2005, 76 pages.
U.S. Appl. No. 11/320,538 / Notice of Missing Parts dated Feb. 2, 2006, 2 pages.
U.S. Appl. No. 11/320,538 / Response to Missing Parts dated Aug. 2, 2006, 36 pages.
U.S. Appl. No. 11/320,538 / Non-final Office dated Apr. 1, 2009, 27 pages.
U.S. Appl. No. 11/320,538 / Amendment dated Jul. 1, 2009, 54 pages.
U.S. Appl. No. 11/320,538 / Final Office Action dated Nov. 2, 2009, 29 pages.
U.S. Appl. No. 11/320,538 / Response to Final Office Acton dated Jan. 4, 2010, 23 pages.
U.S. Appl. No. 11/320,538 / Advisory Action dated Jan. 19, 2010, 3 pages.
U.S. Appl. No. 11/320,538 / RCE and Amendment dated Apr. 2, 2010, 26 pages.
U.S. Appl. No. 11/320,538 / Non-Final Office Action dated Jun. 9, 2010, 24 pages.
U.S. Appl. No. 11/320,538 / Office action dated Dec. 22, 2010, 10 pages.
U.S. Appl. No. 11/320,538 / Notice of Appeal, dated May 23, 2011, 6 pages.
U.S. Appl. No. 11/320,538 / Pre-brief appeal conference decision dated Jun. 30, 2011, 2 pages.
U.S. Appl. No. 11/320,538 / Request for Continued Examination dated Dec. 23, 2011, 21 pages.
U.S. Appl. No. 11/320,538 / Non-Final Office Action, dated Dec. 19, 2012, 12 pages.
U.S. Appl. No. 11/320,538 / Response to Non-final office action, dated Apr. 17, 2013, 20 pages.
U.S. Appl. No. 11/320,538 / Notice of allowance, dated Aug. 1, 2013, 25 pages.
U.S. Appl. No. 11/320,538 / Issue fee payment, dated Nov. 1, 2013, 7 pages.
U.S. Appl. No. 11/320,538 / Rule 312 amendment, dated Nov. 19, 2013, 20 pages.
U.S. Appl. No. 11/320,538 / Issue Notification, dated Dec. 4, 2013, 1 page.
U.S. Appl. No. 14/086,741 / Application as filed Dec. 12, 2013, 77 Pages.
U.S. Appl. No. 14/086,741 / Filing Receipt and Notice to File Missing Parts, dated Dec. 12, 2013, 6 Pages.
U.S. Appl. No. 14/086,741 / Applicant Response to Pre-Exam Formalities Notice, dated Jun. 12, 2014, 60 Pages.
U.S. Appl. No. 14/086,741 / Filing Receipt, dated Jun. 17, 2014, 3 Pages.
U.S. Appl. No. 14/086,741 / Notice of Publication, dated Sep. 25, 2014, 1 Page.
U.S. Appl. No. 14/086,741 / Termical Disclaimer as Filed on Sep. 29, 2014, 1 Page.
U.S. Appl. No. 14/086,741 / Terminal Disclaimer Review Decision, dated Sep. 30, 2014, 1 Page.
U.S. Appl. No. 14/086,741 / Notice of Allowance and Fees and Examiner Summary, dated Oct. 3, 2014, 21 pages.
U.S. Appl. No. 14/086,741 / Notice of Allowance and Fees Due, dated Oct. 3, 2014, 22 pages.

(56) References Cited

OTHER PUBLICATIONS

U.S. Appl. No. 14/086,741 / Amendment after Notice of Allowance, dated Jan. 5, 2015, 14 pages.
U.S. Appl. No. 14/086,741 / Issue Fee Payment, filed Jan. 5, 2015, 1 page.
U.S. Appl. No. 14/086,741 / Response to Amendment under Rule 312, dated Jan. 22, 2015, 2 pages.
U.S. Appl. No. 14/086,741 / Notice of Allowance and Fees and Examiner Search strategy, dated Mar. 16, 2015, 40 pages.
U.S. Appl. No. 14/086,741 / Issue Notification, Apr. 1, 2015, 1 page.
U.S. Appl. No. 14/596,154 / Application as filed Jan. 13, 2015, 60 pages.
U.S. Appl. No. 14/596,154 / Filing Receipt, dated Jan. 27, 2015, 3 pages.
U.S. Appl. No. 14/596,154 / Notice to File Missing Parts, dated Jan. 27, 2015, 3 pages.
U.S. Appl. No. 14/596,154 / Applicant Response to Pre Exam Formalities Notice with Preliminary Amendments, dated Mar. 27, 2015, 85 pages.
U.S. Appl. No. 14/596,154 / Filing Receipt, dated Apr. 2, 2015, 3 pages.
U.S. Appl. No. 14/596,154 / Notice of Publication, dated Jul. 9, 2015, 1 page.
U.S. Appl. No. 14/596,154 / Electronic Terminal Disclaimer Filed and Approved, Nov. 20, 2015, 3 pages.
U.S. Appl. No. 11/361,500 / Application as filed Feb. 23, 2006, 72 pages.
U.S. Appl. No. 11/361,500 / Notice to file missing parts dated Mar. 23, 2006, 2 pages.
U.S. Appl. No. 11/361,500 / Response to Notice to File Missing Parts dated Jul. 19, 2006, 27 pages.
U.S. Appl. No. 11/361,500 / Notice of Publication dated Nov. 16, 2006, 1 page.
U.S. Appl. No. 11/361,500 / Office Action dated May 27, 2009, 18 pages.
U.S. Appl. No. 11/361,500 / Response to Office Action dated Aug. 27, 2009, 34 pages.
U.S. Appl. No. 11/361,500 / Notice of Allowance dated Dec. 11, 2009, 8 pages.
U.S. Appl. No. 11/361,500 / Issue Fee Payment and Rule 312 Amendment dated Jan. 6, 2010, 28 pages.
U.S. Appl. No. 11/361,500 / Response to Rule 312 Amendment dated Jan. 25, 2010, 4 pages.
U.S. Appl. No. 11/361,500 / Issue Notification dated Feb. 24, 2010, 1 page.
U.S. Appl. No. 12/702,243 / Continuation Application with Preliminary Amendment dated Feb. 8, 2010, 83 pages.
U.S. Appl. No. 12/702,243 / Notice of Missing Parts dated Feb. 25, 2010, 2 pages.
U.S. Appl. No. 12/702,243 / Response to Missing Parts dated Apr. 26, 2010, 8 pages.
U.S. Appl. No. 12/702,243 / Filing receipt dated May 4, 2010, 3 pages.
U.S. Appl. No. 12/702,243 / Notice of Publication dated Aug. 12, 2010, 1 page.
U.S. Appl. No. 12/702,243 / Non-Final rejection, dated Aug. 30, 2012, 8 pages.
U.S. Appl. No. 12/702,243 / Amendment, dated Nov. 20, 2012, 14 pages.
U.S. Appl. No. 12/702,243 / Terminal Disclaimer, dated Jan. 2, 2013, 5 pages.
U.S. Appl. No. 12/702,243 Terminal Disclaimer decision, dated Jan. 4, 2013, 1 page 1.
U.S. Appl. No. 12/702,243 / Notice of allowance and fees due and examiner interview summary, dated Jan. 10, 2013, pages.
U.S. Appl. No. 12/702,243 / Issue notification, dated Apr. 24, 2013, 1 page.
U.S. Appl. No. 13/860,482 / Application as filed Apr. 10, 2013, 98 Pages.
U.S. Appl. No. 13/860,482 / Notice to File Missing Parts and Filing Receipt, dated May 21, 2013, 5 Pages.
U.S. Appl. No. 13/860,482 / Applicant Response to Pre-Exam Formalities Notice, dated Oct. 22, 2013, 3 Pages.
U.S. Appl. No. 13/860,482 / Notice of Publication, dated Feb. 6, 2014, 1 Page.
U.S. Appl. No. 13/860,482 / Non-Final Office Action, dated Jun. 9, 2014, 11 Pages.
U.S. Appl. No. 13/860,482 / Non-Final Office Action Response, dated Sep. 8, 2014, 19 Pages.
U.S. Appl. No. 13/860,482 / Terminal Disclaimer Review Decision, Sep. 9, 2014, 1 page.
U.S. Appl. No. 13/860,482 / Terminal Disclaimer Filed, Oct. 8, 2014, 1 page.
U.S. Appl. No. 13/860,482 / Terminal Disclaimer Review Decision, Oct. 9, 2014, 1 page.
U.S. Appl. No. 13/860,482 / Notice of Allowance and Fees Due, dated Nov. 5, 2014, 8 Pages.
U.S. Appl. No. 13/860,482 / Issue Fee Payment and Rule 312 Amendments, dated Feb. 4, 2015, 4 pages.
U.S. Appl. No. 13/860,482 / Issue Notification, dated Mar. 4, 2015, 1 page.
U.S. Appl. No. 14/614,292 / Application as filed Feb. 4 2015, 76 pages.
U.S. Appl. No. 14/614,292 / Notice to File Missing Parts and Filing Receipt, dated Feb. 20, 2015, 5 pages.
U.S. Appl. No. 14/614,292 / Applicant Response to Pre-Exam Formalities Notice and Amendments, filed Apr. 17, 2015, 30 pages.
U.S. Appl. No. 14/614.292 / Filing Receipt, mailed Apr. 24, 2015, 3 pages.
U.S. Appl. No. 14/614,292 / Notice of Publication, dated Aug. 6, 2015, 1 page.
U.S. Appl. No. 14/614,292 / Electronic Terminal Disclaimer Filed and Approved, Nov. 20, 2015, 3 pages.
U.S. Appl. No. 11/412,417 / Application filed Apr. 26, 2006, 96 pages.
U.S. Appl. No. 11/412,417 / Notice of Missing Parts dated May 19, 2006, 2 pages.
U.S. Appl. No. 11/412,417 / Response to Notice of Missing Parts dated Jul. 19, 2006, 14 pages.
U.S. Appl. No. 11/412,417 / Non-final Office Action dated Apr. 1, 2008, 53 pages.
U.S. Appl. No. 11/412,417 / Amendment dated Aug. 1, 2008, 34 pages.
U.S. Appl. No. 11/412,417 / Final Office Action dated Nov. 13, 2008, 40 pages.
U.S. Appl. No. 11/412,417 / RCE and Amendment dated May 12, 2009, 36 pages.
U.S. Appl. No. 11/412,417 / Non-final Office Action dated Jun. 30, 2009, 141 pages.
U.S. Appl. No. 11/412,417 / Examiner Interview Summary dated Oct. 30, 2009, 3 pages.
U.S. Appl. No. 11/412,417 / Amendment dated Oct. 30, 2009, 33 pages.
U.S. Appl. No. 11/412,417 / Final Office Action dated Jan. 4, 2010, 37 pages.
U.S. Appl. No. 11/412,417 /RCE with Amendment filed May 4, 2010, 27 pages.
U.S. Appl. No. 11/412,417 / Supplemental Office Action Response dated Jun. 22, 2010, 22 pages.
U.S. Appl. No. 11/412,417 / Notice of Allowance and bibliographic data sheet dated Jul. 6, 2010, 9 pages.
U.S. Appl. No. 11/412,417 /RCE mailed Oct. 5, 2010, 4 pages.
U.S. Appl. No. 11/412,417 / Notice of Allowance and Bibliographic data sheet dated Oct. 26, 2010, 4 pages.
U.S. Appl. No. 11/412,417 / Issue Fee Payment and Comments on Reasons for Allowance dated Jan. 26, 2011, 6 pages.
U.S. Appl. No. 11/412,417 / Issue Notification dated Feb. 9, 2011, 1 page.
U.S. Appl. No. 13/030,084 / Application filed Feb. 17, 2011, 103 pages.
U.S. Appl. No. 13/030,084 / Filing receipt and Notice to File Missing parts dated Mar. 3, 2011, 6 pages.

(56) References Cited

OTHER PUBLICATIONS

U.S. Appl. No. 13/030,084 / Response to Notice to File Missing Parts, dated Aug. 3, 2011, 23 pages.
U.S. Appl. No. 13/030,084 / Updated filing receipt, dated Aug. 11, 2011, 3 pages.
U.S. Appl. No. 13/030,084 / Non-Final Rejection dated Oct. 26, 2011, 34 pages.
U.S. Appl. No. 13/030,084 / Notice of Publication dated Nov. 17, 2011, 1 page.
U.S. Appl. No. 13/030,084 / Amendment, dated Jan. 26, 2012, 35 pages.
U.S. Appl. No. 13/030,084 / Notice regarding non-compliant amendment, dated Jan. 31, 2012, 4 pages.
U.S. Appl. No. 13/30,084 / Amendment, dated Feb. 9, 2012, 35 pages.
U.S. Appl. No. 13/030,0841 Final Rejection, dated Mar. 28, 2012, 62 pages.
U.S. Appl. No. 13/030,084 / Amendment after final, dated Jun. 14, 2012, 88 pages.
U.S. Appl. No. 13/030,084 / Advisory Action, dated Jun. 26, 2012, 4 pages.
U.S. Appl. No. 13/030,084 / RCE, mailed Jul. 23, 2012, 89 pages.
U.S. Appl. No. 13/030,084 / Notice regarding non-compliant amendment, dated Jul. 25, 2012, 2 pages.
U.S. Appl. No. 13/030,084 / Amendment, dated Jan. 2, 2013, 40 pages.
U.S. Appl. No. 13/030,084 /Refund request, dated Jan. 23, 2013 17 pages.
U.S. Appl. No. 13/030,084 / Non-Final office action, dated Apr. 30, 2013, 39 pages.
U.S. Appl. No. 13/030,084 / Response to non-final office action, dated Jul. 30, 2013, 28 pages.
U.S. Appl. No. 13/030,084 / Non-final office action, dated Oct. 10, 2013, 44 pages.
U.S. Appl. No. 13/030,084 / Response after Non-Final Reject, dated Jan. 2, 2014, 1 Page.
U.S. Appl. No. 13/030,084 / Final Rejection, dated Mar. 19, 2014, 41 Pages.
U.S. Appl. No. 13/030,084 / Amendment Submitted/Entered with Filing of CPA/RCE/ dated May 19, 2014, 38 Pages.
U.S. Appl. No. 13/030,084 / Advisory Action (PTOL-303), dated Jun. 6, 2014, 4 Pages.
U.S. Appl. No. 13/030,084 / Applicant Initiated Interview Summary (PTOL-413), dated Jul. 1, 2014, 3 Pages.
U.S. Appl. No. 13/030,084 / Request for Continued Examination, dated Aug. 15, 2014, 26 Pages.
U.S. Appl. No. 13/030,084 / Non-Final Rejection and Examiner's Search, dated Mar. 24, 2015, 24 pages.
U.S. Appl. No. 13/030,084 / Amendment/Req. Reconsideration After Non-Final Rejection, dated Jun. 24, 2015, 28 pages.
U.S. Appl. No. 13/030,084 / Terminal Disclaimer filed and Approved, Sep. 10, 2015, 3 pages.
U.S. Appl. No. 13/030,084 / Notice of Allowance and Fees, dated Sep. 17, 2015, 24 pages.
U.S. Appl. No. 13/030,084 / Issue Fee Payment and Amendment, dated Dec. 10, 2015, 4 pages.
U.S. Appl. No. 14/968,429 / Application as filed Dec. 14, 2015.
U.S. Appl. No. 13/030,084 / Notice to File Corrected Application Papers dated Aug. 2, 2006, 2 pages.
U.S. Appl. No. 11/480,094 / Response to Notice to File Corrected Application Papers dated Nov. 2, 2006, 32 pages.
U.S. Appl. No. 11/480,094 / Filing Receipt dated Dec. 7, 2006, 3 pages.
U.S. Appl. No. 11/480,094 / Non-final Office Action dated Nov. 7, 2008, 28 pages.
U.S. Appl. No. 11/480,094 / Amendment dated May 7, 2009, 37 pages.
U.S. Appl. No. 11/480,094 / Final Office Action dated Jul. 28, 2009, 16 pages.
U.S. Appl. No. 11/480,094 / RCE with Amendment filed Dec. 28, 2009, 38 pages.
U.S. Appl. No. 11/480,094 / Office Action dated Dec. 15, 2010, 15 pages.
U.S. Appl. No. 11/480,094 / Office Action response, dated May 16, 2011, 29 pages.
U.S. Appl. No. 11/480,094 / Final Office Action, dated Aug. 1, 2011, 13 pages.
U.S. Appl. No. 11/480,094 / Amendment after final Nov. 1, 2011, 32 pages.
U.S. Appl. No. 11/480,094 / Advisory Action dated Nov. 14, 2011, 3 pages.
U.S. Appl. No. 11/480,094 / Notice of Appeal dated Nov. 28, 2011, 1 page.
U.S. Appl. No. 11/480,094 / Abandonment, dated Jul. 31, 2012, 2 pages.
Ferragina et al., "The String B-Tree: A New Data Structure for String Search in External Memory and Its Applications", Journal of the ACM, vol. 46, No. 2, pp. 236-280, 1999.
Prasad et al., "Efficient Bit-Parallel Multi-Patterns String Matching Algorithms for Limited Expression", ACM, pp. 1-6, 2010.
Schmidt et al., "Comparision of Tree and Graph Encodings as Function of Problem Complexity", ACM, pp. 1674-1679, 2007.
Sinha et al, "Efficient Trie Based Sorting of Large Sets of Strings," ACM, pp. 1-8, 2003.
Spinells "Declarative Peephole Optimization Using String Pattern Matching", ACM, pp. 47-51, 1999.
Thiemann, "Grammar-Based Analysis of String Expressions", ACM, pp. 59-70, 2005.
Wagner et al., "The String-to-String Correction Problem", Journal of the Association for Computing Machinery, vol. 21, No. 1, pp. 168-173, 1974.
Xie et al., "S-Looper: Automatice Summarization for Multipath String Loops", ACM, pp. 188-198, 2015.
Yates et al, "A New Approach to Text Searchin", Communications of the ACM, vol. 35, No. 10, pp. 74-82, 1992.
U.S. Appl. No. 11/007,139 / RCE, Sep. 18, 2015, 19 pages.
U.S. Appl. No.11/007,139 / Non-Final Rejection, Dec. 31, 2015, 10 pages.
U.S. Appl. No. 11/007,139 / Amendment/Req. Recondiseration-After Non-Final Rejection, Mar. 28, 2016, 19 pages.
U.S. Appl. No. 11/007,139 / Final Rejection, Jun. 20, 2016, 12 pages.
U.S. Appl. No. 11/007,139 / Response After Final Action, dated Jul. 29, 2016, 17 pages.
U.S. Appl. No. 11/007,139 / Notice of Allowance and Fees, dated Aug. 23, 2016, 10 pages.
U.S. Appl. No. 11/007,139 / Filing Receipt, dated Sep. 2, 2016, 3 pages.
U.S. Appl. No. 15/043,267 / Application as filed Feb. 12, 2016, 92 pages.
U.S. Appl. No. 15/043,267 / Preliminary Amendment, dated Feb. 12, 2016, 7 pages.
U.S. Appl. No. 15/043,267 / Filing Receipt, dated Mar. 7, 2016, 3 pages.
U.S. Appl. No. 15/043,267 / Preliminary Amendment, Jun. 10, 2016, 9 pages.
U.S. Appl. No. 15/043,267 / Filing Receipt, Oct. 25, 2016, 3 pages.
U.S. Appl. No. 12/573,829 / Non-Final Rejection, Jun. 13, 2016, 18 pages.
U.S. Appl. No. 12/573,829 / Amendment/Req. Reconsideration-After Non-Final Reject, dated Sep. 13, 2016, 24 pages.
U.S. Appl. No. 12/573,829 / Filing Receipt, dated Sep. 15, 2016, 3 pages.
U.S. Appl. No. 14/635,836 / Notice of Allowance and Fees Due, Apr. 18, 2016, 25 pages.
U.S. Appl. No. 15/250,118 / Application as filed Aug. 29, 2016, 71 pages.
U.S. Appl. No. 15/250,118 / Preliminary Amendment, Aug. 29, 2016, 20 pages.
U.S. Appl. No. 15/250,118 / Filing Receipt, dated Sep. 9, 2016, 3 pages.

(56) References Cited

OTHER PUBLICATIONS

U.S. Appl. No. 14/625,473 / Notice of Allowance, Mar. 28, 2016, 19 pages.
U.S. Appl. No. 14/625,473 / Issue Fee Payment and Amendments after Notice of Allowance, Jun. 28, 2016, 24 pages.
U.S. Appl. No. 14/625,473 / Response to Amendment under Rule 312, Jun. 30, 2016, 1 page.
U.S. Appl. No. 14/625,473 / Issue Notification, Jul. 20, 2016, 1 page.
U.S. Appl. No. 15/214,168 / Application as filed with preliminary amendments, dated Jul. 19, 2016, 116 pages.
U.S. Appl. No. 15/214,168 / Filing Receipt, Aug. 3, 2016, 4 pages.
U.S. Appl. No. 15/214,168 / Corrected Filing Receipt, Oct. 12, 2016, 4 pages.
U.S. Appl. No. 12/830,236 / Patent Board Decision, Mar. 9, 2016, 6 pages.
U.S. Appl. No. 12/830,236 / RCE and Amendments, Apr. 27, 2016, 15 pages.
U.S. Appl. No. 12/830,236 / Non-Final Rejection and Examiner Search, dated Jun. 29, 2016, 75 pages.
U.S. Appl. No. 12/830,236 / Amendment/Req. Recondiseration-After Non-Final Reject, dated Sep. 6, 2016, 12 pages.
U.S. Appl. No. 14/641,735 / Prelimibary Amendment, dated Jan. 14, 2016, 8 pages.
U.S. Appl. No. 13/632,581 / Filing Receipt, dated Jan. 22, 2016, 4 pages.
U.S. Appl. No. 13/632,581 / Electronic Terminal Disclaimer, Mar. 7, 2016, 3 pages.
U.S. Appl. No. 13/632,581 / Issue Fee Payment, dated Mar. 16, 2016, 1 page.
U.S. Appl. No. 13/632,581 / Amendment after Notice of Allowance, dated Mar. 16, 2016 19 pages.
U.S. Appl. No. 13/632,581 / Response to Amendment under Rule 312, dated Mar. 22, 2016, 2 pages.
U.S. Appl. No. 13/632,581 / Issue Notification, dated Apr. 13, 2016, 1 page.
U.S. Appl. No. 15/081,612 / Application as filed Mar. 25, 2016, 87 Pages.
U.S. Appl. No. 15/081,612 / Notice to File Missing Parts and Filing Receipt, dated Apr. 11, 2016, 4 Pages.
U.S. Appl. No. 15/081,612 / Filing Receipt, Apr. 11, 2016, 3 Pages.
U.S. Appl. No. 15/081,612 / Applicant Response to Pre-Exam Formalities Notice and Preliminary Amendments, dated Jun. 13, 2016, 34 pages.
U.S. Appl. No. 15/081,612 / Preliminary Amendment, Jun. 14, 2016, 4 pages.
U.S. Appl. No. 15/081,612 / Filing Receipt, Jun. 21, 2016, 3 pages.
U.S. Appl. No. 15/081,612 / Non-Final Rejection, Jul. 27, 2016, 9 pages.
U.S. Appl. No. 15/081,612 / Electronic Terminal Disclaimer, dated Sep. 23, 2016, 3 pages.
U.S. Appl. No. 15/081,612 / Notice of Publication, Sep. 29, 2016, 1 page.
U.S. Appl. No. 15/081,612 / Amendment/Req. Reconsideration-After Non-Final Reject, dated Oct. 17, 2016, 10 pages.
U.S. Appl. No. 15/081,612 / Notice of Allowance and Fees, Oct. 27, 2016, 5 pages.
U.S. Appl. No. 14/726,192 / Issue Fee Payment and Amendment after Notice of Allowance, Jul. 18, 2016, 13 pages.
U.S. Appl. No. 14/726,192 / Response to Amendment under Rule 312, Jul. 21, 2016, 1 page.
U.S. Appl. No. 14/726,192 / Response to Amendment under Rule 312, Jul. 22, 2016, 2 pages.
U.S. Appl. No. 14/726,192 / Issue Notification, Aug. 3, 2016, 1 page.
U.S. Appl. No. 15/240,964 / Application and Preliminary Amendments as filed Aug. 18, 2016, 70 pages.
U.S. Appl. No. 15/240,964 / Filing Receipt, dated Aug. 31, 2016, 3 pages.
U.S. Appl. No. 14/614,292 / Non-Final Rejection, dated May 19, 2016, 10 pages.
U.S. Appl. No. 14/614,292 / Amendment/Req. Reconsideration-After Non-Final Rejection, dated Aug. 18, 2016, 20 pages.
U.S. Appl. No. 14/614,292 / Notice of Allowance and Fees, dated Sep. 21, 2016, 8 pages.
U.S. Appl. No. 14/968,429 / Notice of Publication, dated Apr. 28, 2016, 1 page.
Borodin et al., "A Tradeoff Between Search and Update Time for the Implicit Dictionary Problem", Theoretical Computer Science vol. 1 No. 4 (1990), 425-447.
Caviness et al, "Simplification of Radical Expressions", ACM, pp. 329-338, 1976.
Katajainen et al., "Tree Compression and Optimization with Applications", International Journal of Foundations of Computer Science, vol. 1 No. 4 (1990), 425-447.
Hirschberg, "Algorithm for Computing Maximal Common Sebsequences", Communicatoin of the ACM, vol. 18, No. 6, pp. 341-343, 1975.
Siegel, "All Searches Are Divided into Three Parts String Searches Using Ternary Trees", ACM, pp. 57-68, 1988.
U.S. Appl. No. 12/573,829 / Advisory Action/After Final Consideration Program Decision, Aug. 29, 2017, 5 pages.
U.S. Appl. No. 12/573,829 / RCE and Amendments, Sep. 5, 2017, 24 pages.
U.S. Appl. No. 12/573,829 / Non-Final Rejection, Dec. 27, 2017, 13 pages.
U.S. Appl. No. 15/250,118 / Amendment/Req. Reconsideration-After Non-Final Reject, dated Sep. 14, 2017, 44 pages.
U.S. Appl. No. 15/250,118 / Final Rejection, dated Dec. 15, 2017, 25 pages.
U.S. Appl. No. 15/214,168 / Terminal Disclaimer, Jul. 17, 2017, 4 pages.
U.S. Appl. No. 15/214,168 / Notice of Allowance and Fees Due, dated Aug. 1, 2017, 26 pages.
U.S. Appl. No. 15/214,168 / Amendment after Notice of Allowance, dated Nov. 1, 2017, 22 pages.
U.S. Appl. No. 15/214,168 / Issue Notification, dated Nov. 21, 2017, 1 page.
U.S. Appl. No. 15/802,348 / Applicant Response to Pre-Exam Formalities Notice, dated Jan. 9, 2018, 17 pages.
U.S. Appl. No. 15/802,348 / Filing Receipt, dated Jan. 11, 2018, 4 pages.
U.S. Appl. No. 12/830,236 / Amendment/Req. Reconsideration-After Non-Final Reject, dated Oct. 23, 2017, 18 pages.
U.S. Appl. No. 12/830,236 / Non-Final Rejection, dated Feb. 6, 2018, 28 pages.
U.S. Appl. No. 14/641,735 / Non-Final Rejection, dated Jul. 14, 2017, 14 pages.
U.S. Appl. No. 14/641,735 / Letter Restarting Period for Response, dated Aug. 24, 2017, 22 pages.
U.S. Appl. No. 15/240,964 / Final Rejection, dated Aug. 9, 2017, 25 pages.
U.S. Appl. No. 15/240,964 / After Final Consideration Program Request, Oct. 10, 2017, 30 pages.
U.S. Appl. No. 15/240,964 / Advisory Action, dated Oct. 30, 2017, 3 pages.
U.S. Appl. No. 14/596,154 / Non-Final Rejection, dated Sep. 21, 2017, 19 pages.
U.S. Appl. No. 14/596,154 / Amendment/Req. Reconsideration-After Non-Final Reject, dated Dec. 21, 2017, 37 pages.
U.S. Appl. No. 15/411,823 / Non-Final Rejection, dated Jan. 25, 2018, 10 pages.
U.S. Appl. No. 14/968,429 / Amendment/Req. Reconsideration-After Non-Final Reject, dated Aug. 9, 2017, 19 pages.
U.S. Appl. No. 14/968,429 / Final Rejection, dated Oct. 24, 2017, 10 pages.
U.S. Appl. No. 14/968,429 / Response After Final Action, dated Dec. 26, 2017, 28 pages.
U.S. Appl. No. 14/968,429 / Advisory Action, dated Jan. 11, 2018, 5 pages.
U.S. Appl. No. 12/573,829 / Amendment/Req. Reconsideration-After Non-Final Reject, dated Mar. 27, 2018, 22 pages.

(56) References Cited

OTHER PUBLICATIONS

U.S. Appl. No. 15/250,118 / RCE and Amendments, dated Apr. 16, 2018, 44 pages.
U.S. Appl. No. 15/802,348 / Notice of Publication, dated Apr. 19, 2018, 1 page.
U.S. Appl. No. 12/830,236 / Amendment/Req. Reconsideration-After Non-Final Reject, dated May 4, 2018, 26 pages.
U.S. Appl. No. 14/641,735 / Final Rejection, dated Mar. 15, 2018, 25 pages.
U.S. Appl. No. 14/641,735 / Response After Final Action, dated May 15, 2018, 28 pages.
U.S. Appl. No. 14/596,154 / Notice of Allowance and Fees Due, dated May 2, 2018, 8 pages.
U.S. Appl. No. 15/411,823 / Amendment/Req. Reconsideration-After Non-Final Rejection, dated Apr. 24, 2018, 18 pages.
U.S. Appl. No. 15/411,823 / Terminal Disclaimer-Filed and Approved, dated Apr. 24, 2018, 3 pages.
U.S. Appl. No. 14/968,429 / Notice of Allowance and Fees Due, dated Mar. 19, 2018, 6 pages.
U.S. Appl. No. 12/573,829 After Final Consideration Program Request, Sep. 7, 2018, 23 pages.
U.S. Appl. No. 12/573,829 RCE and Amendments, dated Oct. 9, 2018, 20 pages.
U.S. Appl. No. 15/802,348 Preliminary Amendment, dated Oct. 26, 2018, 24 pages.
U.S. Appl. No. 12/830,236 Final Rejection, dated Sep. 5, 2018, 30 pages.
U.S. Appl. No. 12/830,236 After Final Consideration Program Request, Nov. 5, 2018, 24 pages.
U.S. Appl. No. 14/641,735 Preliminary Amendment, dated Oct. 26, 2018, 10 pages.
U.S. Appl. No. 14/641,735 Non-Final Rejection, dated Nov. 2, 2018, 28 pages.
U.S. Appl. No. 15/240,964 Amendment/Req. Reconsideration-After Non-Final Reject, dated Oct. 30, 2018, 43 pages.
U.S. Appl. No. 16/048,113 Applicant Response to Pre-Exam Formalities Notice and Amendment, Oct. 22, 2018, 38 pages.
U.S. Appl. No. 16/048,113 Filing Receipt, Oct. 24, 2018, 3 pages.
U.S. Appl. No. 16/164,430 Application as filed Oct. 18, 2018, 79 pages.
U.S. Appl. No. 16/164,430 Notice to File Missing Parts, Nov. 6, 2018, 2 pages.
U.S. Appl. No. 16/164,430 Filing Receipt, Nov. 6, 2018, 4 pages.
U.S. Appl. No. 16/048,061 Applicant Response to Pre-Exam Formalities Notice, Oct. 12, 2018, 13 pages.
U.S. Appl. No. 16/048,061 Filing Receipt, Oct. 16, 2018, 4 pages.
U.S. Appl. No. 16/048,061 Request for Corrected Filing Receipt, Oct. 31, 2018, 6 pages.
U.S. Appl. No. 16/048,061 Filing Receipt, Nov. 5, 2018, 4 pages.

\* cited by examiner

400

| Binary String | Binary Numeral |
|---|---|
| <0, 1> | $(1\ 0\ 1)_2$ |
| <0,1,1> | $(1\ 0\ 1\ 1)_2$ |

|         | *BEL Strings* |        | *BEL Trees* |
|---------|---------|--------|-----------|
| Natural # | View 1 | View 2 |           |
| 0 | λ | ○ | ○ |
| 1 | < > | ● | ● |
| 2 | <0> | ●—0—● | ● / 0 / ● |
| 3 | <1> | ●—1—● | ● / 1 / ● |
| 4 | <0,0> | ●—0—●—0—● | ● /0 \0 ● ● |
| 5 | <0,1> | ●—0—●—1—● | ● / 0 / ● / 0 / ● |
| 6 | <1,0> | ●—1—●—0—● | ● /0 \1 ● ● |

|  | *BEL Strings* | | *BEL Trees* |
|---|---|---|---|
| Natural # | View 1 | View 2 | |
| 7 | <1,1,> |  | |
| 8 | <0,0,0> |  | |
| 9 | <0,0,1> | | |
| 10 | <0,1,0> |  | |
| 11 | <0,1,1> |  | |
| 12 | <1,0,0> |  | |

| Index | Binary Edge-Labelled Strings | Binary Edge-Labelled Trees |
|---|---|---|
| 0. | $\lambda$ [1] | 0 |
| 1. | < > | 1 |
| 2. | < 0 > | $\#_0 11$ |
| 3. | < 1 > | $\#_1 11$ |
| 4. | < 0, 0 > | $\#_0 1 \#_0 11$ |
| 5. | < 0, 1 > | $\#_0 \#_0 111$ |
| 6. | < 1, 0 > | $\#_1 1 \#_0 11$ |
| 7. | < 1, 1 > | $\#_1 \#_0 111$ |
| 8. | < 0, 0, 0 > | $\#_0 1 \#_0 1 \#_0 11$ |
| 9. | < 0, 0, 1 > | $\#_1 1 \#_1 11$ |
| 10. | < 0, 1, 0 > | $\#_0 \#_0 11 \#_0 11$ |
| 11. | < 0, 1, 1 > | $\#_0 \#_1 111$ |
| 12. | < 1, 0, 0 > | $\#_1 1 \#_0 1 \#_0 11$ |
| 13. | < 1, 0, 1 > | $\#_1 \#_1 111$ |
| 14. | < 1, 1, 0 > | $\#_1 \#_0 111 \#_0 11$ |
| 15. | < 1, 1, 1 > | $\#_0 \#_0 11 \#_1 11$ |

[1] The Greek lower-case symbol lambda denotes the empty string.

| | | |
|---|---|---|
| String A  String B | < 1, 0, 0 > | < 0, 0, 1 > |
| Binary Numerals | $(1100)_2$ | $(1001)_2$ |
| Product | | $(1101100)_2$ |
| Combination of Strings A and B | | < 1,0,1,1,0,0 > |

MANIPULATING SETS OF HIERARCHICAL DATA

RELATED APPLICATIONS

The present patent application is a continuation of U.S. nonprovisional patent application Ser. No. 13/229,624, filed on Sep. 9, 2011, titled "Manipulating Sets of Hierarchical Data," by LeTourneau, which claims priority from U.S. patent application Ser. No. 11/005,859, filed on Dec. 6, 2004, and issued on Oct. 11, 2011 as U.S. Pat. No. 8,037, 102, titled "Manipulating Sets of Hierarchical Data," by LeTourneau, and also claims priority to U.S. provisional patent application Ser. No. 60/543,371, filed on Feb. 9, 2004, titled "Manipulating Sets of Hierarchical Data," by LeTourneau, all of the foregoing herein incorporated by reference in its entirely, and assigned to the assignee of the currently claimed subject matter.

BACKGROUND

This disclosure is related to hierarchical data arrangements and, more particularly, to manipulating such data arrangements.

In a variety of fields, data or a set of data, may be represented in a hierarchical fashion. This form of representation may, for example, convey information, such as particular relationships between particular pieces of data and the like. However, manipulating such data representations is not straight-forward, particularly where the data is arranged in a complex hierarchy. Without loss of generality, one example may include a relational database. Techniques for performing operations on such a database, for example, are computationally complex or otherwise cumbersome. A continuing need, therefore, exists for additional techniques for manipulating data hierarchies.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 5 is a table illustrating representations of binary strings and binary numerals that may be associated in one particular embodiment;

FIGS. 8a, 8b, and 8c are a table illustrating a particular embodiment of an association between binary stings and binary edge labeled trees;

FIG. 9 is a table illustrating a portion of the Kleene enumeration of non-composite numerals;

FIG. 10 is a table illustrating one embodiment of a linear notation for representing a graphical depiction of a hierarchical set of data;

FIG. 23 is a schematic diagram illustrating one embodiment of a technique for combining binary strings.

DETAILED DESCRIPTION

Figure 1:
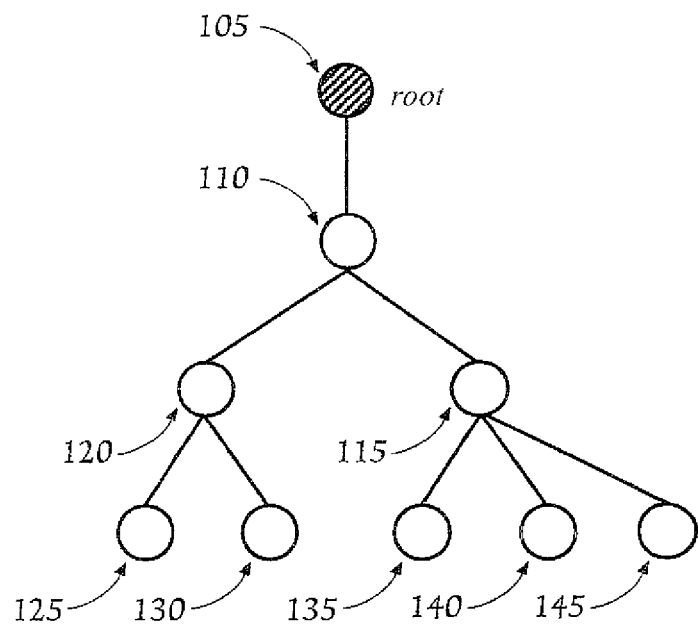
FIG. 1 is a schematic diagram of one embodiment of a tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

In a variety of fields, data or sets of data may be represented in a hierarchical fashion. This form of representation may, for example, convey information, such as particular relationships between particular pieces of data and the like. However, manipulating such data representations is not straight forward, particularly where the data is arranged in a complex hierarchy. Without loss of generality, one example may include a relational data base. Techniques for performing operations on such a data base for example, may be computationally complex or otherwise cumbersome. A continuing need, therefore, exists for additional techniques for manipulating data hierarchies.

As previously discussed, in a variety of fields, it is convenient or desirable to represent data, a set of data and/or other information in a hierarchical fashion. In this context, such a hierarchy of data shall be referred to as a "tree." In a particular embodiment, a tree may comprise a finite, rooted, connected, unordered, acyclic graph. This is illustrated here, for example, in FIG. 1 by embodiment 100. As illustrated, the root of this particular embodiment encompasses node 105. In addition to 105, there are eight other nodes designated 110 to 140, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop. Here, unordered refers to the notion that there is no implied ordering or precedence among nodes attached to a common node, despite the appearance of ordering in a graphical illustration.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data or values may be limited to binary data, that is, in this example, either a binary one or a binary zero. Here, such an embodiment may be referred to as a binary edge labeled tree (BELT), as shall be discussed in more detail hereinafter.

Figure 2:
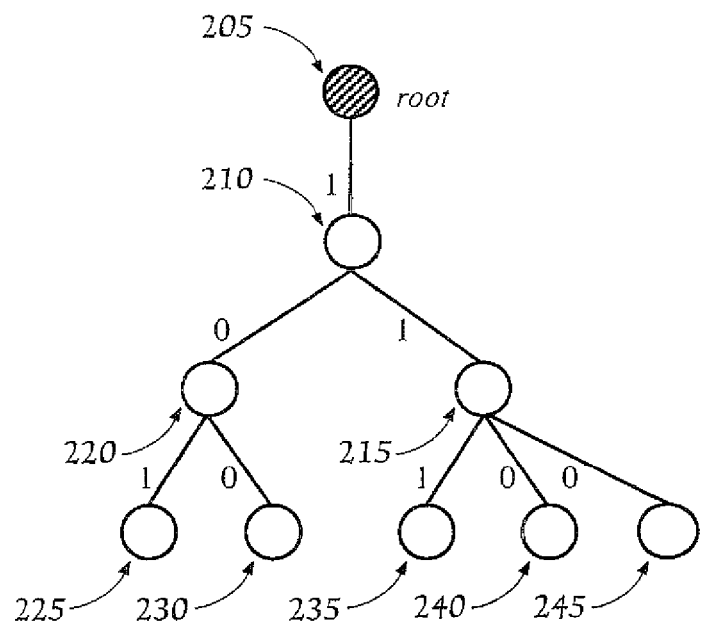
FIG. 2 is a schematic diagram illustrating one embodiment of a binary edge labeled tree.
Figure 3:
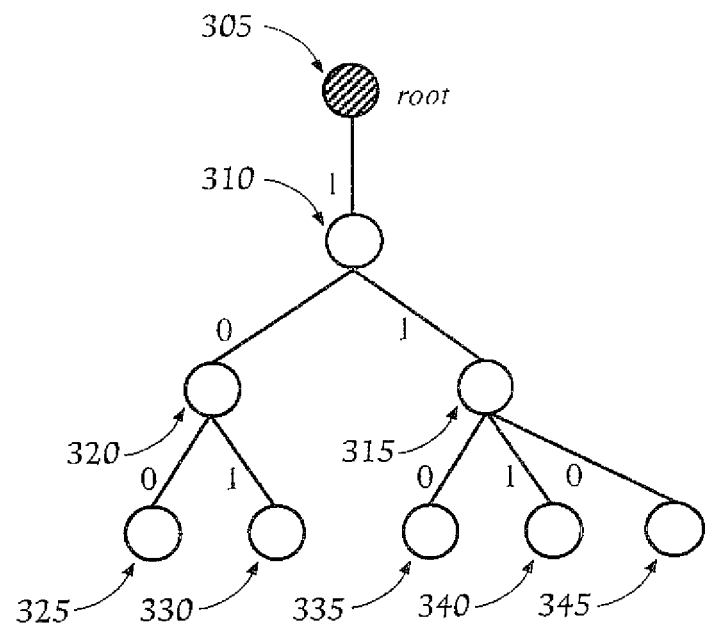
FIG. 3 is a schematic diagram illustrating another embodiment of a binary edge labeled tree.

One example of a BELT is illustrated by embodiment 200 of FIG. 2. Thus, as illustrated, the edges of the BELT shown in FIG. 2 are labeled with either a binary zero or binary one. FIG. 3 illustrates another embodiment 300 of a different binary edge labeled tree. It is noted that this tree is similar or isomorphic to the embodiment of FIG. 2.

Figure 4:
FIG. 4 is a schematic diagram illustrating an embodiment of a binary edge labeled string.

A subset of BELTs may be referred to in this context as binary edge labeled strings (BELSs). One embodiment, 400, is illustrated in FIG. 4. Thus, as illustrated by embodiment 400, this particular binary edge labeled string comprises four nodes and three edges, where the edges are labeled, respectively, binary zero, binary one and binary zero. Thus, a binary edge labeled string comprises a binary edge labeled tree in which each node has no more than two edges. To reiterate, in this context, a string comprises a binary edge labeled string and a tree comprises a binary edge labeled tree if each edge of the string or tree respectively stores a single bit. Likewise, in this context, two nodes are employed to support an edge holding a single piece of binary data. At this point, it is worth noting that strings and trees having nodes and edges, such as previously described, may be represented in a computing platform or similar computing device through a data structure or a similar mechanism intended to capture the hierarchical relationship of the data. It is intended that all such embodiments are included within the scope of the claimed subject matter.

As may be apparent by a comparison of FIG. 4 with, for example, FIG. 2 or FIG. 3, typically a binary edge labeled tree has the ability to be richer and convey more data and/or more information than a binary edge labeled string, although, of course, depending on the particular tree and the particular string, there may be contrary examples, such as where the string is particularly large and the tree is particular small. The aspect of BELTs to be richer in information may be one potential motivation to employ BELTs over BELSs, for example.

Despite the prior observation, as shall be described in more detail hereinafter, an association may be made between any particular binary edge labeled string and a binary edge labeled tree or vice-versa, that is, between any particular binary edge labeled tree and a binary edge labeled string. In particular, as shall be explained in more detail hereinafter, an association may be constructed between binary edge labeled trees and binary edge labeled strings by enumerating in a consecutive order binary edge labeled strings and binary edge labeled trees, respectively, and associating the respectively enumerated strings and trees with natural numerals. Of course, as shall become more clear hereinafter, many embodiments of associations between trees and strings or between trees and natural numerals are possible. It is intended that the claimed subject matter include such embodiments.

In this context, it may be useful to draw a distinction between binary numerals or binary data values and binary strings. FIG. 5, for example, illustrates a binary string and its associated binary numeral or data value. All binary numerals or binary data values may be represented with a binary string, but not vice-versa. One reason for this is that all binary data values or numerals, except the binary data value zero, begin with a binary one, but not so for binary strings. Likewise, there are many different ways to represent binary strings, and the claimed subject matter is not limited to any particular technique to make such a representation. For example, FIG. 6 illustrates two techniques or approaches to viewing essentially or substantially the same binary string.

Figure 6:
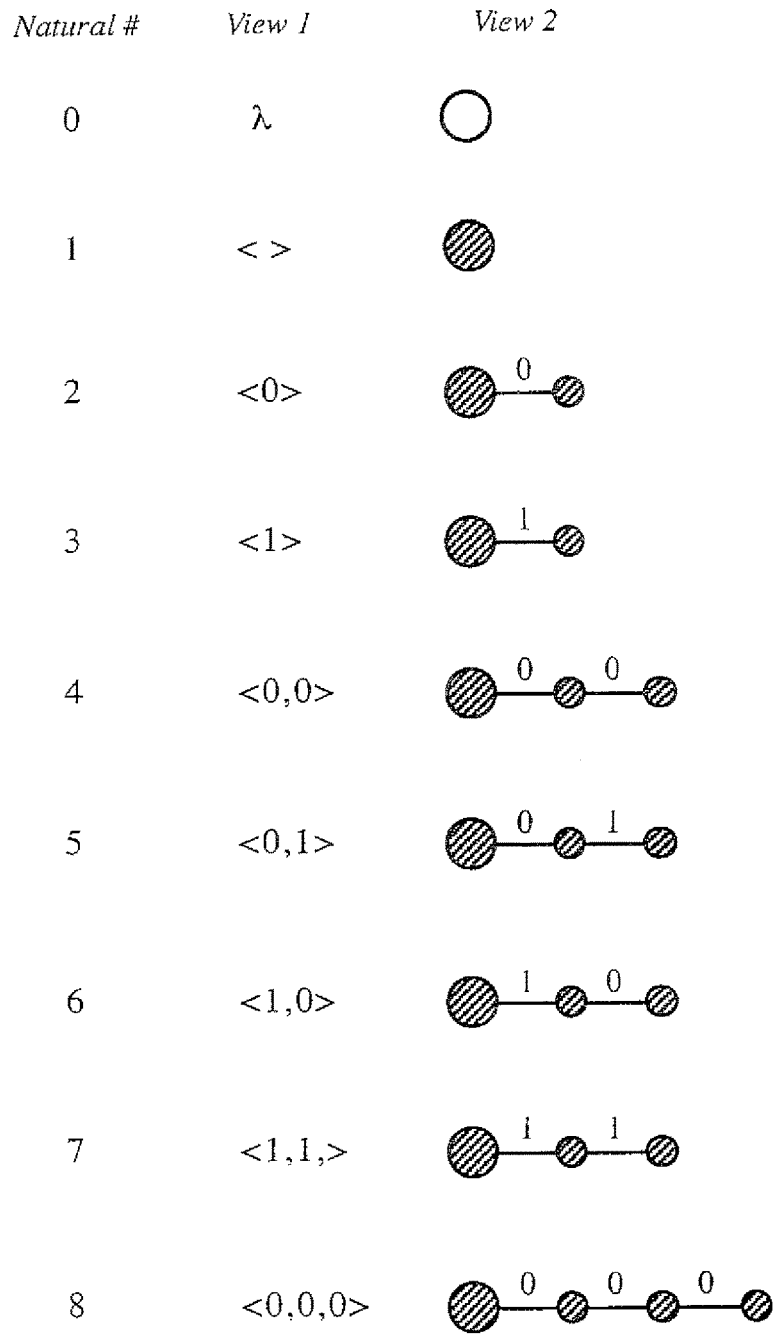
FIG. 6 is a table illustrating representations of binary strings that may be associated in one particular embodiment.

FIG. 6, therefore, has three columns. Column two contains the conventional or standard method to represent a binary string, such as may be employed in the field of computer science, for example. Along the same row, column three contains a graphical representation of substantially the same binary string using a binary edge labeled string, such as previously described. Likewise, column one, along the same row, contains a natural numeral that corresponds to the particular binary string of the particular row.

However, this particular order of binary strings is not the typical order that is well-known and employed, for example, in technical fields, such as computer science and/or electrical engineering. Typically, for binary numerals, for example, to form the next consecutive binary numeral after one, a binary digit or bit is added to the right. For example, in an ordered sense, the binary numeral following binary numeral one, $(1)_2$, is the binary numeral one zero, $(10)_2$.

In contrast, for the table illustrated in FIG. 6, a binary digit or bit is added to the left; however, a similar convention of adding a binary zero before a binary one is employed. Thus, as one example, the binary string after the binary string, one <1>, is the binary string, zero zero <0,0>. Furthermore, this particular ordering or enumeration of binary strings begins with the string with no nodes, which, for this particular embodiment, is associated with the natural numeral zero and has a symbolic representation here that comprises a lambda (λ). In this context, this may be referred to as the empty binary string or zero node binary edge labeled string. Next in the enumeration is the binary string that comprises a single node and, therefore, holds no data. In this particular embodiment, this is associated with the natural number one, and is depicted by a graphical representation that comprises a single node. This is referred to here as the one node binary string. For higher positive natural numerals, as previously suggested, to represent a single bit for a binary edge labeled string, two nodes are employed.

One technique for converting from a particular binary string, such as in column two, for example, to the natural numerals in column one, includes inserting a binary numeral one in front of the binary string, and then converting the binary numeral one plus the binary digits of the binary string to a binary numeral. The natural numeral, corresponding to that binary numeral by converting from base two to base ten, provides the desired result. Thus, one embodiment of a method of enumerating a set of strings, in this case binary strings, includes positioning, at a location k, where k represents a positive natural numeral, a binary string such that the string comprises the binary numeral corresponding to k with the left most binary digit omitted. Again, as previously suggested and illustrated in FIG. 6, by column three, binary strings may be represented by binary edge labeled strings or BELS, although the claimed subject matter is not limited in scope in this respect.

Figure 7:
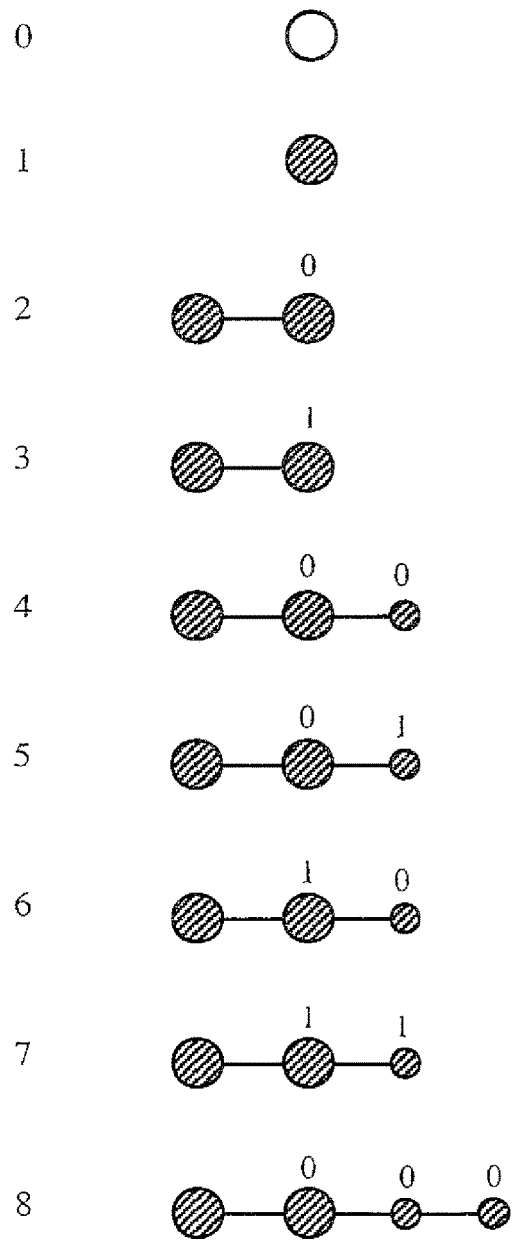
FIG. 7 is another table illustrating representations binary strings that may be associated in one particular embodiment.

As alluded to previously, there are many ways to represent binary strings and it is intended to include all such representations within the scope of the claimed subject matter. As simply one example, FIG. 7 illustrates yet another view of a binary string. Column two of FIG. 7 provides particular examples of binary node labeled strings, rather than binary edge labeled strings. Thus, as will be discussed in more detail hereinafter, binary edge labeled strings and binary node labeled strings may comprise nearly interchangeable representations of a binary string, although, again, other representations are also included within the scope of the claimed subject matter.

In addition to enumerating binary strings, which may be accomplished by adding a bit to the left, as previously described, in one embodiment, alternatively, if a set of specific binary strings are provided, those strings may be ordered. An embodiment of a method of ordering, such as for the previously described embodiment, includes proceeding longer strings with shorter strings. However, for ordering strings of the same length, such strings may be ordered by converting to their associated values, as previously described, by adding binary numeral one to the left of the string, and placing the associated values in conventional ascending numerical order.

Just as binary strings may be ordered and/or enumerated, likewise binary edge labeled trees may also be enumerated and/or ordered. This is illustrated, for example, in FIG. 8. In this particular table, two views or representations of binary strings are associated with a particular representation of binary edge labeled trees. It is noted that this particular figure also includes the associated natural numerals. The association of such numerals for this particular embodiment should be clear based at least in part on the prior description.

Figure 8B:
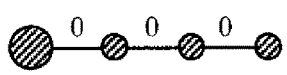
Figure 8B:
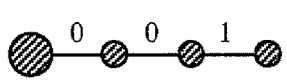
Figure 8B:
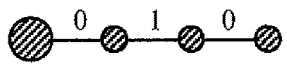
Figure 8B:
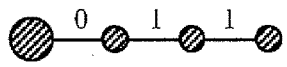
Figure 8B:
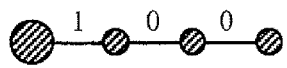
Figure 8C:
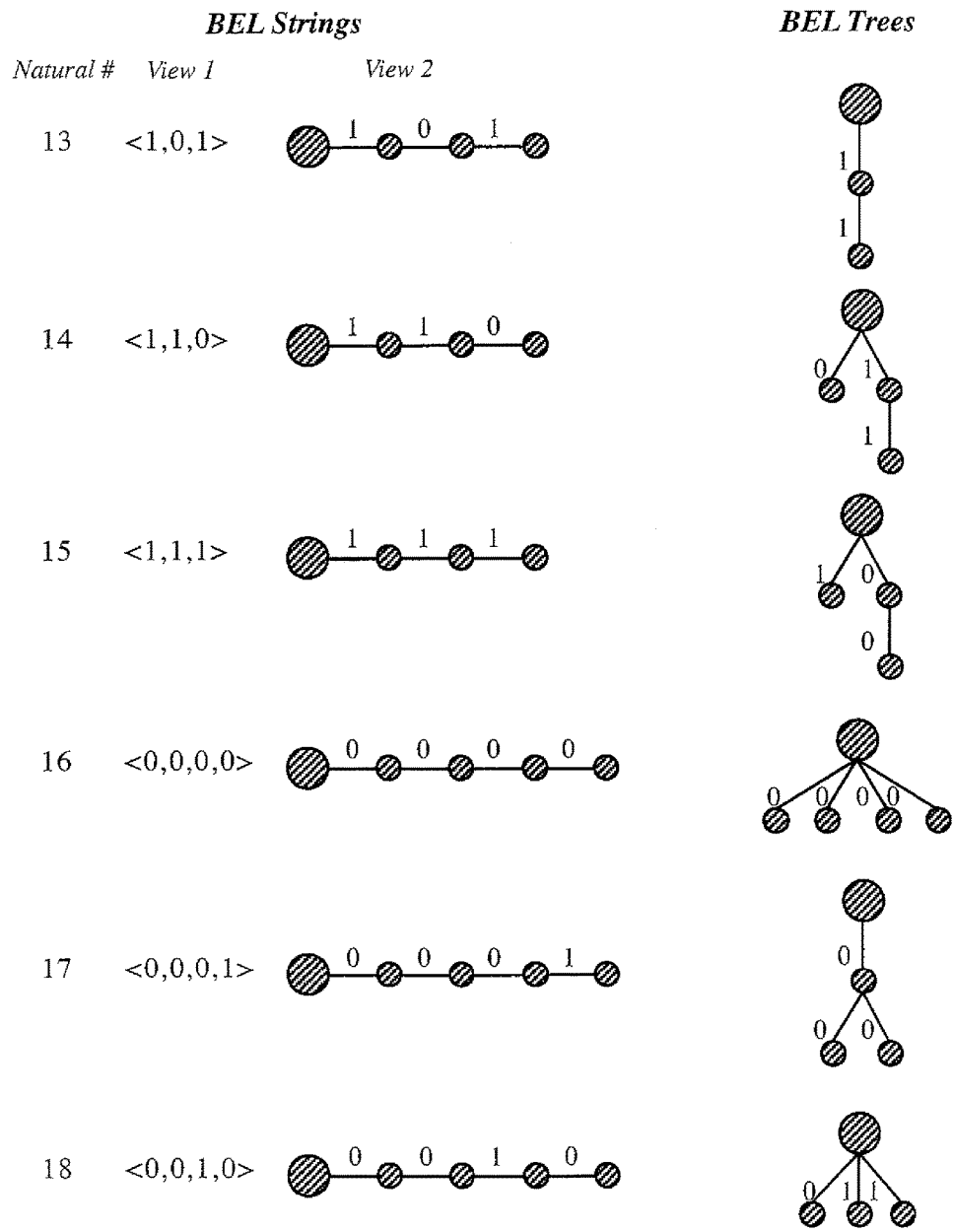

Thus, for this particular embodiment, although the claimed subject matter is not limited in scope in this respect, a method of enumerating a set of trees begins with enumeration of an empty binary edge labeled tree and a one node binary edge labeled tree, similar to the empty binary string and one node binary string, previously described. Thus, as for binary strings, here, the empty tree is associated with the natural numeral zero and has a symbolic representation as illustrated in FIG. 8a (circle). Likewise, the one node tree, which holds no data, is associated with the natural numeral one and has a graphical representation of a single node. For higher positive natural numbers, however, this embodiment of a method of enumerating a set of trees comprises positioning a tree at location k, k being a positive natural numeral greater than three, where k is the product of u and v, u and v comprising positive natural numerals greater than one, such that the tree is formed by a union of the trees at positions u and v. Likewise, for those locations that are not a product of other natural positive numerals greater than one, that is, for locations that comprise non-composite numerals, denoted here by j, for example, j being a positive natural number greater than one, a tree is positioned at location j such that the tree is formed by finding the first tree in the prior enumeration such that the binary edge labeled tree obtainable from this first tree by attaching a node to the particular tree as a new root node and labeling the edge between the new root node and the prior root node with a binary "0" label is not in the enumeration at some position lower than j; however, if the binary edge labeled tree obtainable from that first tree, as just described, is present in the enumeration with a binary "0" label for the new edge, but not with a binary "1" label, then the tree at position j is that tree with a binary "1" label for the new edge. This may be illustrated, for example in FIG. 8, as described in more detail below.

As illustrated, for this particular embodiment, and as previously described, the empty tree has zero nodes and is associated with the natural numeral zero. Likewise, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, in order to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

Figure 9:
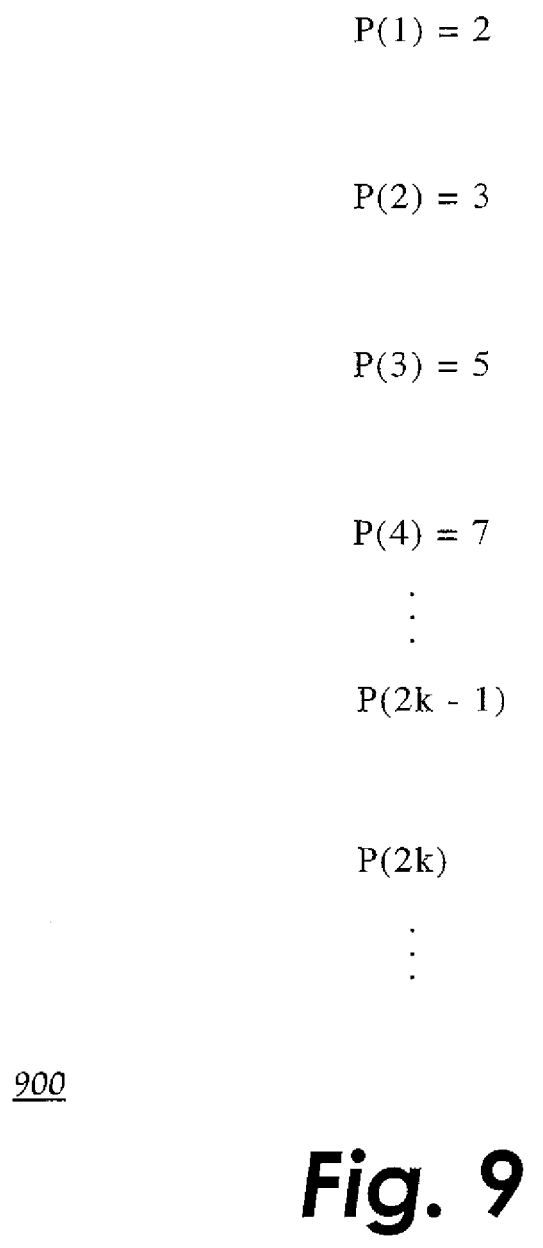

In this context, adding a root node and an edge and labeling it binary zero is referred to as a "zero-push" operation and adding a root node and an edge and labeling it binary one is referred to as a "one-push" operation. Based at least in part on the prior description, for this particular embodiment, it may now be demonstrated that if k is any positive natural numeral and a tree x is positioned at location k, then a non-composite numeral is associated with the zero-push of that tree and a non-composite numeral is associated with the one-push for that tree. Furthermore, the non-composite index of the zero-push of the tree comprises $2k-1$, whereas the non-composite index of the one-push of the tree comprises $2k$, where the index corresponds to the argument of the well-known Kleene enumeration on positive natural numerals of non-composite numerals, as illustrated, for example, in part in FIG. 9. Thus, referring again to FIG. 8, the one-push of the root tree is the tree at position three. This follows from FIG. 9 since $P(2*1)=P(2)=3$. Likewise, the tree at position five is the zero-push of the tree at position 2. Again, this follows from FIG. 9 since $P(2*2-1)=P(3)=5$.

In this context, the approach just described may be referred to as vectorizing non-composite numerals. In the embodiment just described, this was accomplished in pairs, although, of course, the claimed subject matter is not limited in scope in this respect. This may be accomplished in any number of numeral combinations, such as triplets, quadruplets, etc. Thus, using a quadruplet example, it is possible to construct trees such that if k is any positive natural numeral and a tree x is positioned at location k, then a non-composite numeral is associated with the zero-push of that tree, a non-composite numeral is associated with the one-push for that tree, a non-composite numeral is associated with the two-push for that tree, and a non-composite number is associated with the three-push for that tree. Furthermore, the index of the non-composite numeral is such that for a zero-push of the tree, the index comprises (4k−3), for a one-push of a tree, the index comprises (4k−2), for a two-push of a tree, the index comprises (4k−1), and for a three-push of a tree the index comprise (4k), where the index corresponds to the Kleene enumeration of non-composite numerals, P(index), such as provided in FIG. 9.

In the previously described enumeration of binary edged labeled trees, a mechanism may be employed to reduce or convert complex manipulations of hierarchical data to multiplication of natural numerals. For example, if it is desired to combine, or merge at their roots, two trees of hierarchical data, a complex task both computationally and graphically, instead, for this particular embodiment, the two trees may be converted to numerical data by using the previously described association embodiment between binary edge labeled trees and natural numerals. The resulting numerical data from the prior conversion may then be multiplied, and the resulting product may then be converted to a binary edge labeled tree by using a table look up of the previously described association embodiment. It is noted that a subtle distinction may be made between an enumeration embodiment and an association embodiment. Enumeration may comprise listing, in this example, a particular ordered embodiment of BELTs, whereas an association provides a relationship between, in this example, a particular ordered embodiment of BELTs and natural numerals. It is, of course, appreciated that many different enumeration and association embodiments may be employed to execute the operations discussed above and hereinafter, and the claimed subject matter is intended to cover all such enumeration and association embodiments.

Alternatively, a similar approach may be employed to combine two trees using binary strings, rather than numerical data. Thus, using the prior embodiment previously discussed in which particular binary strings and BELTs are associated, the BELTs may be converted to binary strings. The binary strings may be combined, and the resulting combination of strings may then be converted to a tree using the association embodiment, as described, for example, above. It is noted that in this particular context, combining binary strings refers to an operation as illustrated in FIG. 26. The binary strings are converted to binary numerals, such as previously described. The converted binary numerals may be multiplied, and the resulting binary numeral product may then be converted to a binary string, again, as previously described.

Likewise, a process embodiment that is a reversal to the previously described embodiments may also be employed. Thus, complex hierarchies of data may be split or divided, when this is desired. For example, a binary edge labeled tree to be divided may be converted to a piece of numerical data, such as by using the previously described association embodiment. This data may then be factored into two pieces of numerical data whose product produces the previously mentioned piece of numerical data. These two pieces of numerical data may then be converted to trees, again, by using the prior association embodiment, for example.

A similar approach may be employed using binary strings, analogous to the approach described above using binary strings to combine trees. Thus, a tree to be divided may be converted to a binary string using, for example, the previous association embodiment. This string may be split into two separate binary strings and these two separate binary strings may then be converted to two binary edge labeled trees, using the association embodiment previously discussed. Again, to do so, the binary string may be converted to a binary numeral. The binary numeral may then be factored into two binary numerals, and these two binary numerals may be converted to binary strings.

Another form of manipulating hierarchical sets of data may involve ordering or hashing. This may be desirable for any one of a number of different operations to be performed on the sets of data. One approach is similar to the previously described embodiment. For example, it may be desired to order a given set of trees. Doing so may involve converting the trees to numerical data, as previously described, using an association embodiment. The numerical data may then be ordered and the numerical data may then be converted back to binary edge labeled trees using the previously described association embodiment, or an alternate association embodiment, for example.

It is noted that there may be any one of a number of different ways of converting from numerals or numerical data values to a binary edge labeled tree or from a binary string to a binary edge labeled tree, and vice-versa. Nonetheless, a convenient method for doing so with this particular embodiment includes storing a table providing an association embodiment between natural numerals, binary strings and binary edge labeled trees, such as the embodiment previously described. Thus, once it is desired to convert from one to the other, such as from a binary string to a BELT, from a natural number to a BELT, or vice-versa, for example, a table look up operation may be performed using the association embodiment.

Techniques for performing table look ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data may be formed by combining two or more hierarchies of data, such as by applying a previously described embodiment. Likewise, multiple hierarchies of data may be formed by splitting or dividing a particular hierarchy of data, again, such as by applying a previously described embodiment. Likewise, additional operations and/or manipulations of data hierarchies may be performed, such as ordering hierarchies of data and more. It is intended that the claimed subject matter cover such embodiments.

Much of the prior discussion was provided in the context of binary edge labeled trees. Nonetheless, as alluded to previously, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. This is illustrated, for example, in FIG. 7. Thus, rather than employing binary edge labeled trees, the previously described embodiments may alternatively be performed using binary node labeled trees. As one example embodiment, operations and/or manipulations may be employed using binary edge labeled trees and then the resulting binary edge labeled tree may be converted to a binary node labeled tree. However, in another embodiment, operations and/or manipulations may be performed directly using binary node labeled trees where a different association embodiment, that is, in this example, one that employs binary node labeled trees, is employed.

In accordance with the claimed subject matter, therefore, any tree or any string, regardless of whether it is binary edge labeled, binary node labeled, non-binary, a feature tree, or otherwise, may be manipulated and/or operated upon in a manner similar to the approach of the previously described embodiments. Typically, different association embodiments shall be employed, depending at least in part, for example, upon the particular type of tree and/or string. For example, and as shall be described in more detail below in connection with FIG. 11, a node labeled tree in which the nodes are labeled with natural numerals or data values may be converted to a binary edge labeled tree. Furthermore, this may be accomplished with approximately the same amount of storage. For example, for this particular embodiment, this may involve substantially the same amount of node and/or edge data label values.

Figure 11:
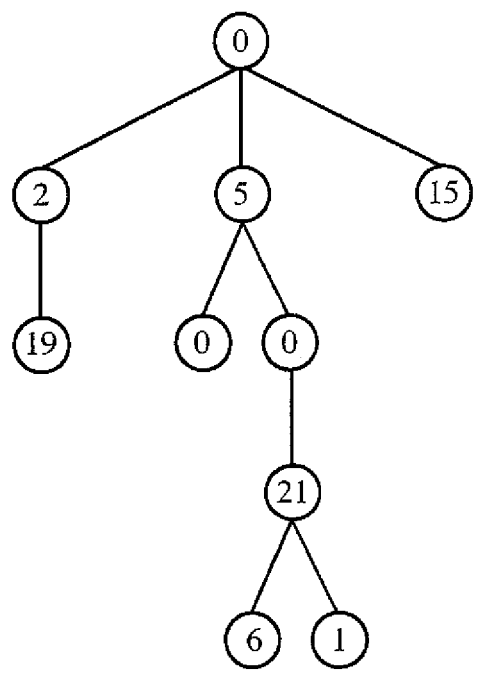
FIG. 11 is a schematic diagram of an embodiment of a node labeled tree.

As previously noted, the claimed subject matter is not limited in scope to this particular example, however, as illustrated in more detail hereinafter, the tree illustrated in FIG. 11 is converted to a binary edge labeled tree through a sequence of processing depicted here as graph operations, although such a conversion may alternatively be implemented by operations implemented otherwise, one such example being a computing platform, for example. Alternatively, it may be desirable, depending upon the particular embodiment, to convert trees to, for example binary node labeled trees. Likewise, other embodiments in which trees of one form are converted to trees of another form are also included within the scope of the claimed subject. However, for this particular embodiment, it will be assumed that the association between trees and strings, such as previously described, is depicted or enumerated in terms of binary edge labeled trees, as previously illustrated, for example. Thus, in this example, a particular tree, embodiment 1100, is illustrated in FIG. 11, comprises a node labeled tree rather than an edge labeled tree.

Figure 12:
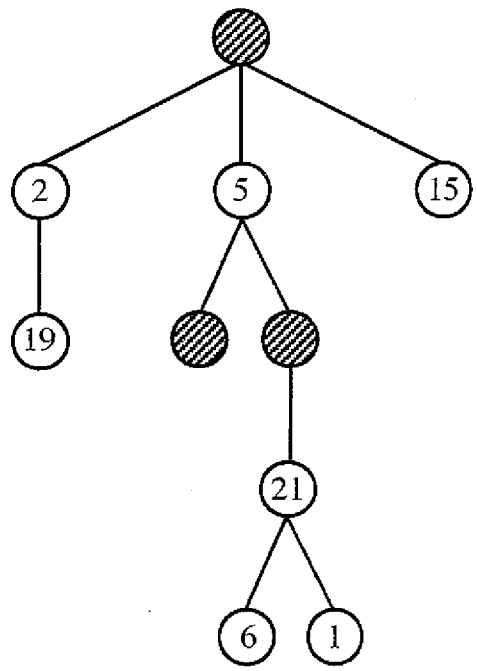
FIGS. 12-17 illustrate application of various operations to convert the embodiment of FIG. 11 from one type of tree to another type of tree.
Figure 13:
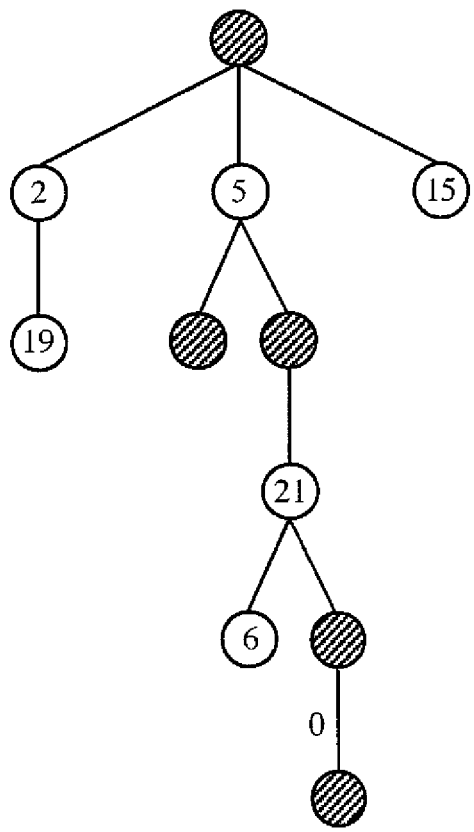
Figure 14:
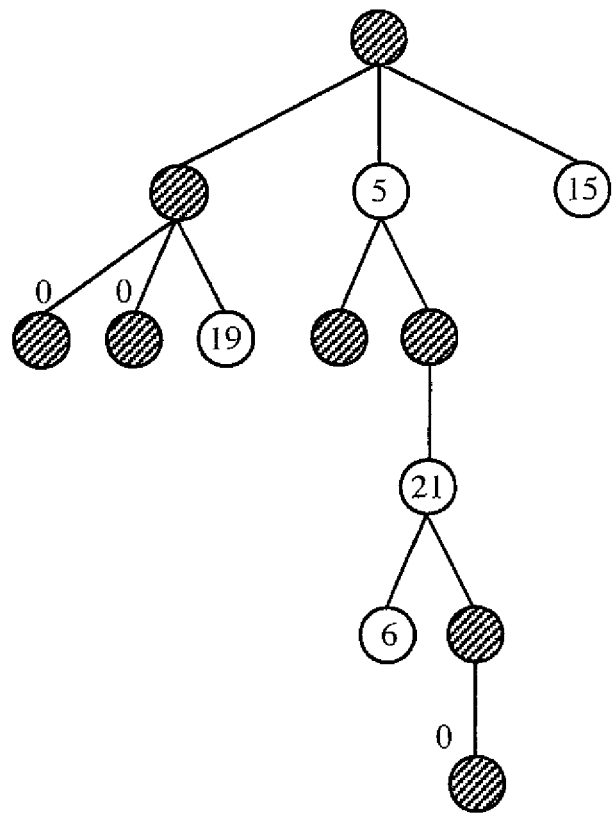

Referring now to FIG. 11, node values are deleted for those nodes storing the value zero. This is illustrated, for example, in FIG. 12. Node values are also deleted for the nodes storing the value one. In this case, a new single unlabeled node is attached to those nodes that had stored the value one, and the edge between the prior node and the new node is labeled with a zero value. This is illustrated, for example, in FIG. 13. For nodes with a value k that is a power of 2, and larger than one, the node value is deleted and ($\log_2(k)+1$) new nodes are attached, labeling the edge between the new nodes and the old nodes with a zero value. This, for example, is illustrated in FIG. 14.

Figure 15:
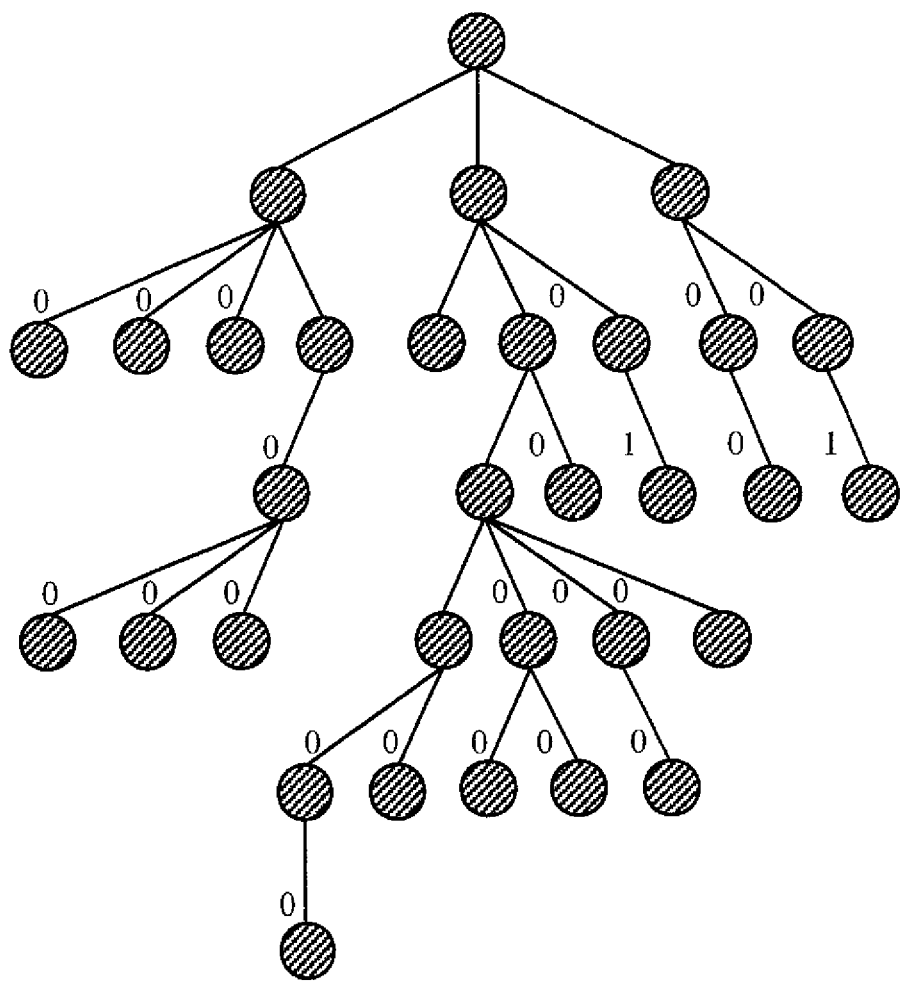
Figure 16:
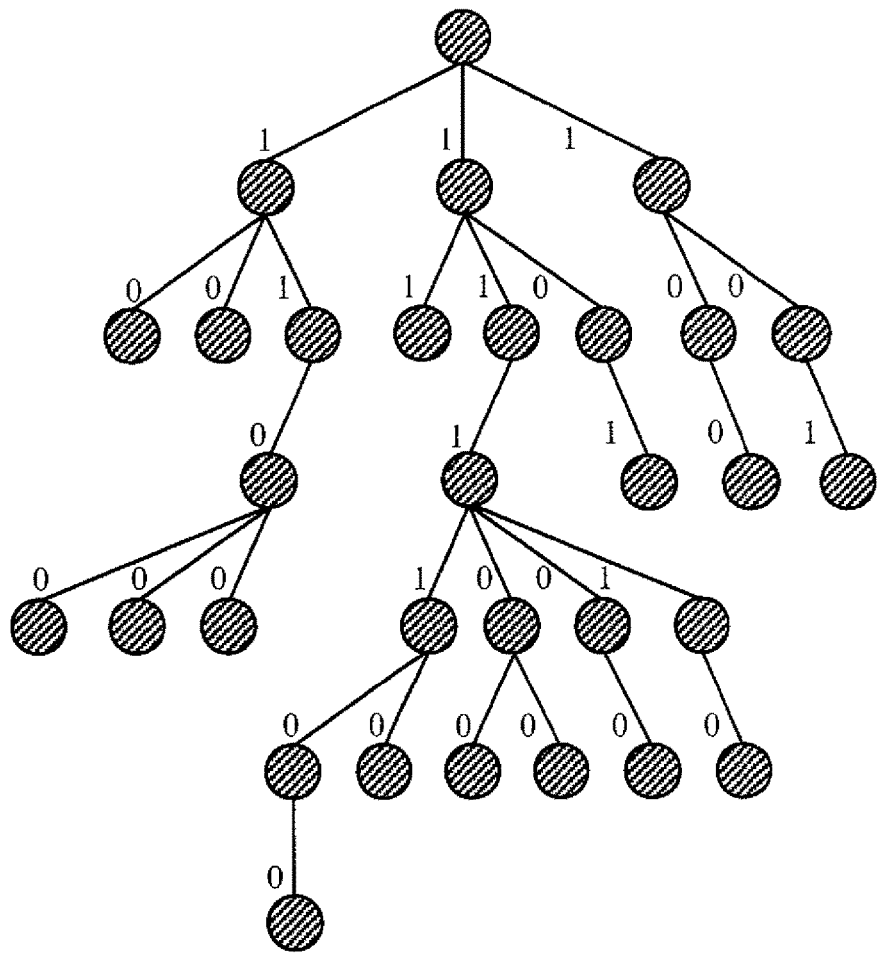

The remaining node values comprise non-powers of two that are 3 or larger. These node values are factored into one or more non-composite numerals. For the resulting non-composite numerals, the non-composite numeral is replaced with the tag value of the index, for example, i, for the non-composite. For this particular embodiment, the term, tag value of index, i, for example, refers to a binary edge labeled tree in the previously discussed embodiment of a string-tree association that corresponds to a binary string associated with the binary numeral for i. The new edges of the tree are labeled with the binary value zero. This is illustrated, for example, in FIG. 15. The remaining edges of the tree are labeled with a binary value of one. This is illustrated in FIG. 16.

Figure 17:
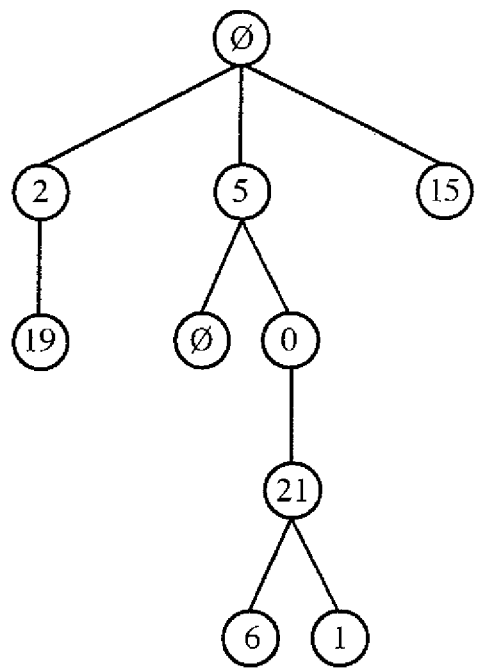

In another embodiment, however, a particular tree may include null types or, more particularly, some node values denoted by the empty set. This is illustrated, for example, by the tree in FIG. 17, although, of course, this is simply one example. An advantage of employing null types includes the ability to address a broader array of hierarchical data sets. For example, without loss of generality and not intending to limit the scope of the claimed subject matter in any way, a null type permits representing in a relational database, as one example, situations where a particular attribute does not exist. As may be appreciated, this is different from a situation, for example, where a particular attribute may take on a numeral value of zero. Thus, it may be desirable to be able to address both situations when representing, operating upon and/or manipulating hierarchical sets of data.

Figure 18:
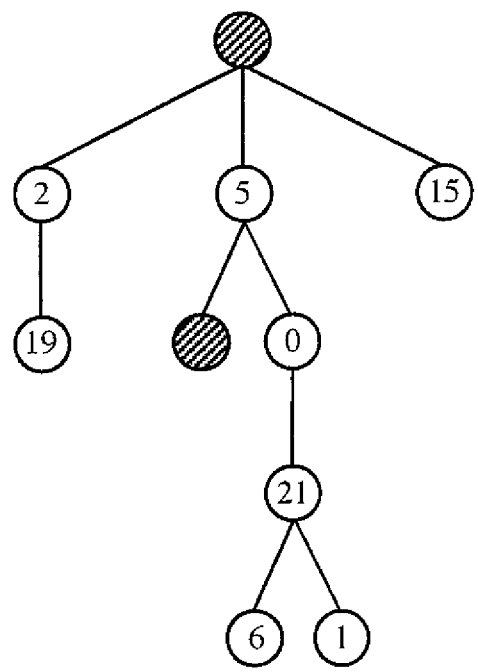
FIG. 18 is a schematic diagram illustrating another embodiment of a node labeled tree.

For this particular embodiment, a tree with nulls, as described above, may be converted to a tree without nulls. This shall be illustrated, for example, for nodes labeled with a null, such as for the tree in FIG. 17; however, the claimed subject matter is not limited in scope in this respect, of course. In this particular embodiment, the nulls are deleted from those nodes having a null. This is illustrated, for example, by FIG. 18.

Figure 19:
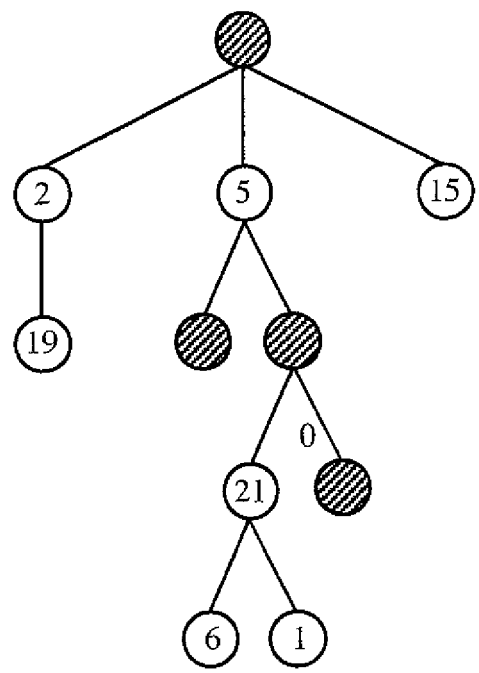
FIGS. 19-22 illustrate application of various operations to convert the embodiment of FIG. 18 from one type of tree to another type of tree.
Figure 20:
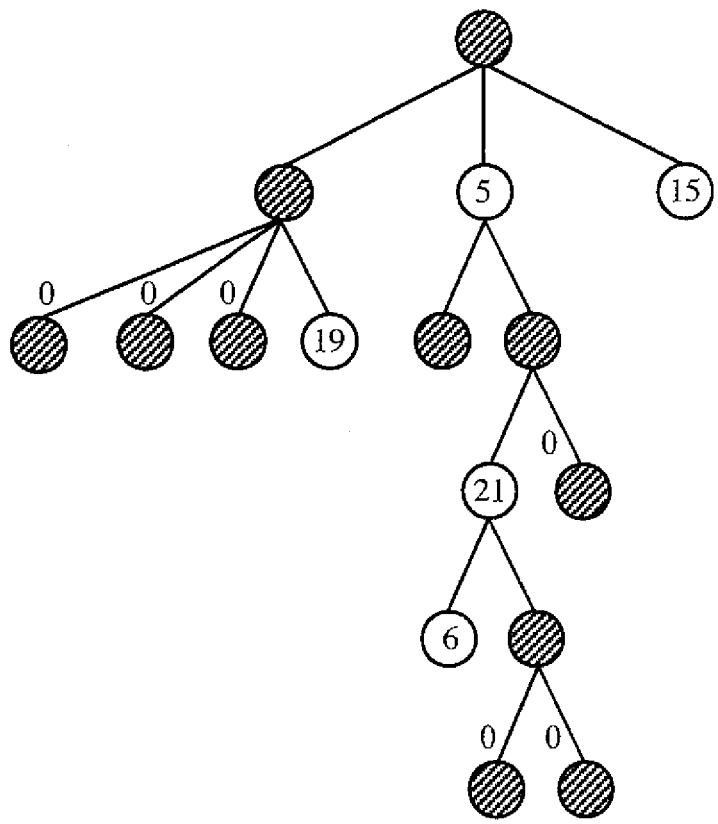

Referring now to FIG. 19, node values are also deleted for those nodes storing the value zero. Furthermore, a single new node is attached to the nodes previously storing the zero values. The edge between the prior nodes and the new nodes are labeled with a zero value. For nodes with a value k that is a power of 2, including the value one, the node value is deleted and ($\log_2(k)+2$) new nodes are attached, labeling the edge between the new nodes and the old nodes with a zero value. This is illustrated, for example, in FIG. 20.

Figure 21:
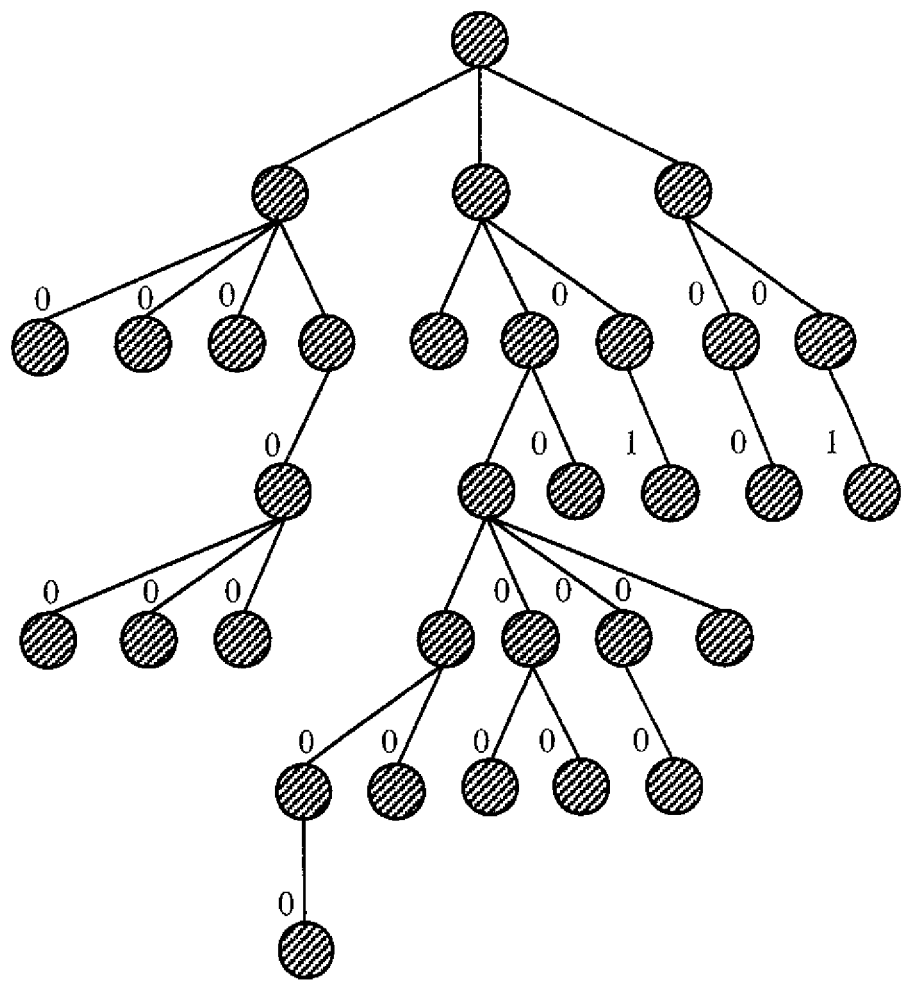
Figure 22:
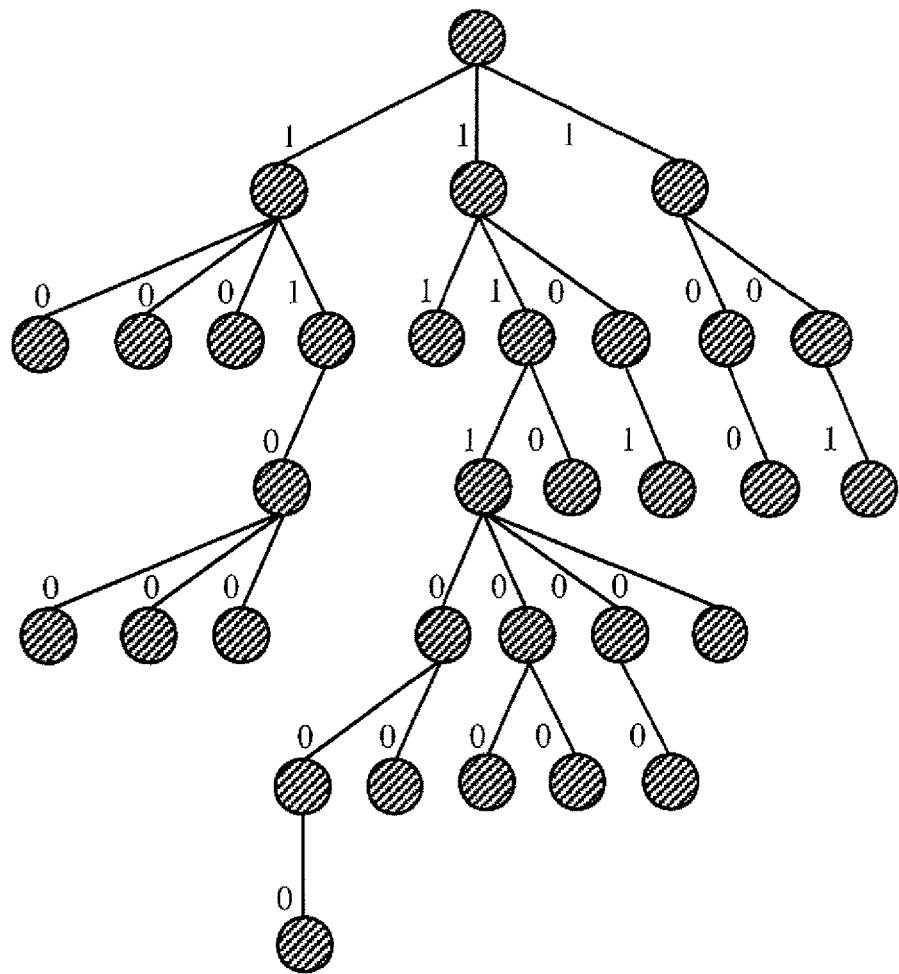

The remaining node values comprise non-powers of two that are 3 or larger. These node values are factored into one or more non-composite numerals. For the resulting non-composite numerals, the non-composite numeral is replaced with the tag value of the index, for example, i, for the non-composite. For this particular embodiment, the term, tag value of index, i, for example, refers to a binary edge labeled tree in the previously discussed embodiment of a string-tree association that corresponds to a binary string associated with the binary numeral for i. The new edges are labeled with a binary value of zero. This is illustrated, for example, in FIG. 21. The remaining edges are labeled with a binary value of one. This tree is illustrated, for example, in FIG. 22.

Likewise, in an alternative embodiment, a node labeled tree may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied. Furthermore, for one embodiment, a tree in which nodes are labeled with numerals or numerical data, rather than binary data, may be converted to a binary edge labeled tree and/or binary node labeled tree, and, for another embodiment, a tree in which edges are labeled with numerals or numerical data, rather than binary data, may be converted to a binary edge labeled tree and/or binary node labeled tree.

Furthermore, a tree in which both the nodes and the edges are labeled may be referred to in this context as a feature tree and may be converted to a binary edge labeled tree and/or binary node labeled tree. For example, without intending to limit the scope of the claimed subject matter, in one approach, a feature tree may be converted by converting any labeled node with its labeled outgoing edge to an ordered pair of labels for the particular node. Using the embodiment described above, this tree may then be converted to a binary edge labeled tree.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to binary edge labeled trees, such as by applying the previously described embodiment, for example.

A similar conversion exists for binary strings. In this context, therefore, depending upon the particular embodiment, for example, binary strings may be depicted as binary edge labeled strings, binary node labeled strings, and the like. Furthermore, for those embodiments in which labels are not binary, for example, a conversion may be made to a binary node labeled string and/or binary edge labeled string, for example. Alternatively, as described previously in connection with trees, depending on the particular embodiment, strings in these alternative forms (e.g., numerals versus binary data) may be manipulated and/or operated upon directly. Thus, in this context, when referring to an embodiment of an association, the association is meant to refer an association between strings and trees, where binary edge labeled strings and binary edge labeled trees are one particular embodiment. Thus, other embodiments may provide a similar type of association, however, such embodiments may alternative use binary node labels and the like. A similar proposition applies for association embodiments between natural numbers and strings and/or between natural numbers and trees. Thus, when referring to an embodiment of an association, the association is meant to refer a particular association between natural numerals and trees or between natural numerals and strings, where here binary edge labeled strings and binary edge labeled trees are one particular embodiment.

As previously described, trees may be employed to graphically represent a hierarchy of data or a hierarchy of a set of data. This has been illustrated in some detail for binary edge labeled trees, for example. As the previous figures, illustrate, however, such graphical hierarchical representations typically employ two spatial dimensions to depict the relationship among different pieces of data. This may be disadvantageous in some situations where a one dimensional representation or arrangement of symbols, such as is employed with alphabetic letters, for example, that are combined to create a linear collection of successive symbols or notations, such as words, would be more convenient.

FIG. 10 is a table that illustrates one particular embodiment of employing symbols, concatenated along one spatial dimension, here from left to right, by convention, to represent such a data hierarchy. The table includes four columns. The first column denotes natural numerals. The second column denotes binary strings, such as those are previously described. The third column denotes a one dimensional arrangement of symbols employed to represent the binary edge labeled trees for that particular position. Of course, as previously described in connection with prior embodiments, the claimed subject matter is not limited in scope to binary strings or binary edge labeled trees. Thus, in alternative embodiments, any tree may be represented with symbols organized in a one dimensional arrangement, as is demonstrated with this particular embodiment.

For this particular embodiment, the symbols are parsed to reduce redundancy of information. For this particular embodiment, the symbols $\#_0$, and $\#_1$ are employed, to represent zero-push and one-push operations, respectively, although, of course, this is merely an embodiment. Any symbols may be employed, including, for example, symbols differentiated by color, symbols differentiated by shape, and the like.

A first symbol, such as for this particular embodiment, a "1," may be employed to represent a node or an edge. For this particular embodiment, "1" represents a node. Additional symbols may be employed, in this particular embodiment, to represent labels of a node or an edge. Again, in this particular embodiment, for binary edge labeled trees, symbols are employed to represent labels of edges. Again, for this particular embodiment, two different labels are employed, a label for a binary one and a different label for a binary zero. Of course, "1" and "0" may be employed and another symbol may be employed to represent nodes in an alternative embodiment. However, using symbols other than "1" and "0" to represent binary one and binary zero reduces confusion with other typical and/or well-known binary numeral schemes.

Here, the linear or successive order of the symbols is employed to represent the graphical hierarchy. Thus, for a labeled edge, the label for that particular edge precedes the symbols that represent the nodes for the particular edge. As one example, consider the representation of the binary edge labeled tree associated with position two. As illustrated by FIG. 10 in comparison with FIG. 8, the label representing binary zero is provided immediately ahead of two adjacent symbols for nodes. The "1" immediately after the label represents the bottom node and the next "1" represents the root node. Thus, the number of "1"s represents the number of nodes for the particular binary edge labeled tree in this particular embodiment. The particular label therefore indicates here that the edge connecting the nodes is labeled binary zero. Likewise, a similar approach is employed for the representation of the tree for position three. Thus, the label of the edge connecting the two nodes comprises a binary one. In contrast, for the position for the binary edge labeled tree of position four, the first symbol represents the binary "0" label and the second symbol represents the bottom node for that edge. The other node for that particular edge is the root node. The symbols are then repeated, representing another edge labeled with a binary zero connected to the root node.

This above may be contrasted with the representation for position five of this association embodiment in which the labels for the edges are immediately adjacent each other and symbols for the nodes associated with the labeled edges are after the two adjacent label symbols. This indicates that the edges are connected to each other, as illustrated by the graphical representation of this particular binary edge labeled tree, rather than each being connected to the root note, as in the prior tree. Of course, the successive edges are then connected to the root node at the top, illustrated by the final "1" at position five. Thus, using this particular embodiment, it is possible to representation all binary edge labeled trees using three symbols going from left to right.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method of merging at least a first complex two dimensional graphical hierarchy and a second complex two dimensional graphical hierarchy to yield a third complex two dimensional graphical hierarchy, the first, second, and third complex two dimensional graphical hierarchies being in the form of a labeled tree hierarchy, the method comprising:

accessing instructions from one or more physical memory devices for execution by one or more processors;

executing instructions accessed from the one or more physical devices by the one or more processors;

storing, in at least one of the physical memory devices, signal values, including numerical signal values, resulting from having executed the instructions on the one or more processors;

wherein the accessed instructions to merge complex two dimensional graphical hierarchies; and wherein executing the merging instructions further comprising:

accessing from the one or more physical memory devices, a first numerical signal value corresponding to the first complex two dimensional graphical hierarchy and a second numerical signal value corresponding to the second complex two dimensional graphical hierarchy, the first and second numerical signal values based, at least in part, on a stored ordered association between numerical signal values and labeled tree hierarchies, wherein each complex two dimensional graphical hierarchy to be merged has a corresponding unique numerical signal value;

combining the first numerical signal value and the second numerical signal value to yield a third numerical signal value; and generating the third complex two dimensional graphical hierarchy based, at least in part on the third numerical signal value, using the stored ordered association between the numerical signal values and the labeled tree hierarchies; and wherein executing the merging instructions further comprises using the stored ordered association to produce one or more numerical signal values to represent the third complex two dimensional graphical hierarchy after the generation of the third complex two dimensional graphical hierarchy and storing the one or more produced numerical signal values.

2. The method of claim 1, wherein the stored one or more produced numerical signal values are stored as one or more digital signal values.

3. The method of claim 1 wherein executing the merging instructions further comprises displaying the third complex two dimensional graphical hierarchy.

4. The method of claim 1, wherein the first numerical signal value and the second numerical signal value are in the form of one or more digital signal values.

5. The method of claim 1, wherein the at least the first and the second complex two dimensional graphical hierarchies are in the form of binary edge labeled trees.

6. The method of claim 1, wherein executing the merging instructions further comprises converting the at least the first and the second complex two dimensional graphical hierarchies to complex two dimensional hierarchies in the form of binary edge labeled trees.

7. The method of claim 1, wherein at least one of the first and the second complex two dimensional graphical hierarchies includes at least one null label signal value.

8. The method of claim 7, wherein executing the merging instructions further comprises converting the at least one of the first and the second complex two dimensional graphical hierarchies that includes at least one null label signal value to a complex two dimensional hierarchy without a null label signal value.

9. The method of claim 8, wherein executing the merging instructions further comprises converting the complex two dimensional hierarchy without the null label signal value to a complex two dimensional hierarchy in the form of a binary edge labeled tree.

10. The method of claim 1, wherein executing the merging instructions further comprises converting the at least the first and the second complex two dimensional graphical hierarchies trees to complex two dimensional graphical hierarchies in the form of binary node labeled trees.

11. The method of claim 1, wherein the first and the second numerical signal values comprise binary numerical signal values.

12. The method of claim 1, wherein the first and the second numerical signal values are converted to binary numerical signal values.

13. The method of claim 1, wherein the stored ordered association is stored in memory as a table.

14. An apparatus for merging at least a first complex two dimensional graphical hierarchy and a second complex two dimensional graphical hierarchy to yield a third complex two dimensional graphical hierarchy, the first, second, and third complex two dimensional graphical hierarchies to be in the form of a labeled tree hierarchy, the apparatus comprising:

one or more processors coupled to one or more physical memory devices to store executable instructions and to store binary digital signal quantities as physical memory states, wherein the executable instructions being accessible from the one or more physical memory devices for execution by the one or more processors; and the one or more processors able to store in at least one of the physical memory devices, binary signal quantities, if any, that are to result from execution of the instructions on the one or more processors, wherein the accessed executable merger instructions to generate complex two dimensional graphical hierarchies; and wherein the merger instructions further to:

access from the one or more physical memory devices, a first numerical signal value to correspond to the first complex two dimensional graphical hierarchy and a second numerical signal value to correspond to the second complex two dimensional graphical hierarchy, the first and second numerical signal values to be based, at least in part, on a stored ordered association between numerical signal values and labeled tree hierarchies, wherein each complex two dimensional graphical hierarchy to be merged to have a corresponding unique numerical signal value;

combine the first numerical signal value and the second numerical signal value to yield a third numerical signal value; and generate the third complex two dimensional graphical hierarchy based, at least in part, on the third numerical signal value and the stored ordered association between the numerical signal values and the labeled tree hierarchies, and wherein the merger instructions being further executable by the one or more processors to: use the stored ordered association to produce one or more numerical signal values to represent the third complex two dimensional graphical hierarchy after the generation of the third complex two dimensional graphical hierarchy and store the one or more produced numerical signal values.

15. The apparatus of claim 14, wherein the stored one or more produced numerical signal values are to be stored as one or more digital signal values.

16. The apparatus of claim 14, wherein the merger instructions being further executable by the one or more processors to display the third complex two dimensional graphical hierarchy.

17. The apparatus of claim 14, wherein the first numerical signal value and the second numerical signal value are to be in the form of one or more digital signal values.

18. The apparatus of claim 14, wherein the at least the first and the second complex two dimensional graphical hierarchies are to be in the form of binary edge labeled trees.

19. The apparatus of claim 14, wherein the merger instructions being further executable by the one or more processors to convert the at least the first and the second complex two dimensional graphical hierarchies to complex two dimensional hierarchies in the form of binary edge labeled trees.

20. The apparatus of claim 14, wherein at least one of the first and the second complex two dimensional graphical hierarchies is to include at least one null label signal value.

21. The apparatus of claim 20, wherein the merger instructions being further executable by the one or more processors to convert the at least one of the first and the second complex two dimensional graphical hierarchies that is to include at least one null label signal value to a complex two dimensional hierarchy without a null label signal value.

22. The apparatus of claim 21, wherein the merger instructions being further executable by the one or more processors to convert the complex two dimensional hierarchy without the null label signal value to a complex two dimensional hierarchy in the form of a binary edge labeled tree.

23. The apparatus of claim 14, wherein the merger instructions being further executable by the one or more processors to convert the at least the first and the second complex two dimensional graphical hierarchies to complex two dimensional graphical hierarchies in the form of binary node labeled trees.

24. The apparatus of claim 14, wherein the first and the second numeral values are to comprise binary numerical signal values.

25. The apparatus of claim 14, wherein the merger instructions being further executable by the one or more processors to convert the first and the second numeral values are to binary numerical signal values.

26. The apparatus of claim 14, wherein the stored ordered association is to be stored in memory as a table.

27. An article for merging at least a first complex two dimensional graphical hierarchy and a second complex two dimensional graphical hierarchy to yield a third complex two dimensional graphical hierarchy, the first, second, and third complex two dimensional graphical hierarchies to be in the form of a labeled tree hierarchy, the article comprising a non-transitory storage medium comprising instructions stored thereon: wherein the instructions being accessible from the non-transitory storage medium to store as physical memory states on one or more physical memory devices, the one or more physical memory devices coupled to one or more processors able to execute the instructions stored as physical memory states, the one or more physical memory devices also able to store binary digital signal quantities, if any, as physical memory states, that are to result from execution of the instructions on the one or more processors, wherein the executable merger instructions to generate complex two dimensional graphical hierarchies; and wherein the merger instructions further to:

access from the one or more physical memory devices, a first numerical signal value to represent correspond to the first complex two dimensional graphical hierarchy and a second numerical signal value to represent correspond to the second complex two dimensional graphical hierarchy, the first and second numerical signal values to be based, at least in part, on a stored ordered association between numerical signal values and labeled tree hierarchies, wherein each complex two dimensional graphical hierarchy to be merged to have a corresponding unique numerical signal value:

combine the first numerical signal value and the second numerical signal value to yield a third numerical signal value; and generate the third complex two dimensional graphical hierarchy based, at least in part on, the third numerical signal value, and the stored ordered association between the numerical signal values and the labeled tree hierarchies, and wherein the merger instructions being further executable by the one or more processors to: use the stored ordered association to produce one or more numerical signal values to represent the third complex two dimensional graphical hierarchy after the generation of the third complex two dimensional graphical hierarchy and store the one or more produced numerical signal values.

28. The article of claim 27, wherein the stored one or more produced numerical signal values are to be stored as one or more digital signal values.

29. The article of claim 27, the merger instructions being further executable by the one or more processors to display the third complex two dimensional graphical hierarchy.

30. The article of claim 27, wherein the first numerical signal value and the second numerical signal value are to be in the form of one or more digital signal values.

31. The article of claim 27, wherein the at least the first and the second complex two dimensional graphical hierarchies are to be in the form of binary edge labeled trees.

32. The article of claim 27, wherein the merger instructions being further executable by the one or more processors to convert the at least the first and the second complex two dimensional graphical hierarchies to complex two dimensional hierarchies in the form of binary edge labeled trees.

33. The article of claim 27, wherein at least one of the first and the second complex two dimensional graphical hierarchies is to include at least one null label signal value.

34. The article of claim 33, wherein the merger instructions being further executable by the one or more processors to convert the at least one of the first and the second complex two dimensional graphical hierarchies that is to include at least one null label signal value to a complex two dimensional hierarchy without a null label signal value.

35. The article of claim 34, wherein the merger instructions being further executable by the one or more processors to convert the complex two dimensional hierarchy without the null label signal value to a complex two dimensional hierarchy in the form of a binary edge labeled tree.

36. The article of claim 27, wherein the merger instructions being further executable by the one or more processors to convert the at least the first and the second complex two dimensional graphical hierarchies trees to complex two dimensional graphical hierarchies in the form of binary node labeled trees.

37. The article of claim 27, wherein the first and the second numerical signal values are to comprise binary numerical signal values.

38. The article of claim 27, wherein the merger instructions being further executable by the one or more processors to convert the first and the second numeral values are to be converted to binary numerical signal values.

39. The article of claim 27, wherein the stored ordered association is to be stored in memory as a table.

40. The method of claim 1, wherein the one or more physical memory devices also store a database or a portion thereof and wherein the first, second and third complex two dimensional graphical hierarchies correspond to content in the database.

41. The apparatus of claim 14, wherein the one or more physical memory devices also store a database or a portion thereof and wherein the first, second and third complex two dimensional graphical hierarchies correspond to content in database.

42. The article of claim 27, wherein the one or more physical memory devices also store a database or a portion thereof and wherein the first, second and third complex two dimensional graphical hierarchies correspond to content in the database.

\* \* \* \* \*